United States Patent
Fukui

(10) Patent No.: US 11,968,338 B2
(45) Date of Patent: Apr. 23, 2024

(54) INFORMATION PROCESSING APPARATUS AND METHOD FOR CONTROLLING INFORMATION PROCESSING APPARATUS

(71) Applicant: CANON KABUSHIKI KAISHA, Tokyo (JP)

(72) Inventor: Akitomo Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 17/842,590

(22) Filed: Jun. 16, 2022

(65) Prior Publication Data

US 2022/0407968 A1    Dec. 22, 2022

(30) Foreign Application Priority Data

Jun. 18, 2021  (JP) .................................. 2021-101993

(51) Int. Cl.
    *G09G 3/10*    (2006.01)
    *G06F 3/042*    (2006.01)
    *G06F 3/044*    (2006.01)
    *H04N 1/00*    (2006.01)

(52) U.S. Cl.
    CPC ....... *H04N 1/00411* (2013.01); *G06F 3/0428* (2013.01); *G06F 3/0446* (2019.05); *H04N 1/00397* (2013.01); *H04N 1/00403* (2013.01); *G06F 2203/04108* (2013.01); *H04N 2201/0093* (2013.01); *H04N 2201/0094* (2013.01)

(58) Field of Classification Search
    CPC ........... H04N 1/00411; H04N 1/00397; H04N 1/00403; H04N 2201/0093; H04N 2201/0094; G06F 3/0428; G06F 3/0446; G06F 2203/04108; G06F 3/0421
    USPC .............................. 174/559; 345/41, 42, 174
    See application file for complete search history.

(56) References Cited

U.S. PATENT DOCUMENTS

| | | | |
|---|---|---|---|
| 11,204,668 B2 * | 12/2021 | Choi | G06V 40/1318 |
| 2013/0241853 A1 * | 9/2013 | Tanaka | G06F 3/0488 345/173 |

(Continued)

FOREIGN PATENT DOCUMENTS

| | | |
|---|---|---|
| JP | 2006323521 A | 11/2006 |
| JP | 2014-092988 A | 5/2014 |

(Continued)

*Primary Examiner* — Thuy N Pardo
(74) *Attorney, Agent, or Firm* — Canon U.S.A., Inc. I.P. Division

(57) ABSTRACT

An information processing apparatus includes a display unit, a first detection unit that detects a position of an object located in a vertical direction with respect to the display unit and that interacts with the display unit in a contactless manner, wherein detecting the position results in detecting an instruction associated with the at least one input object that is displayed on the display unit and corresponds to the position of the object, a second detection unit configured to detect confirmation of the instruction detected by the first detection unit, and an input unit configured to input data corresponding to the at least one input object in a case where the second detection unit detects confirmation of the instruction associated with the at least one input object in a state where the first detection unit detects the instruction associated with the at least one input object.

9 Claims, 22 Drawing Sheets

(56) References Cited

U.S. PATENT DOCUMENTS

| | | | |
|---|---|---|---|
| 2015/0067513 A1* | 3/2015 | Zambetti | G06F 3/0488 |
| | | | 715/771 |
| 2016/0253041 A1* | 9/2016 | Park | G06F 3/0445 |
| | | | 345/174 |
| 2016/0299680 A1* | 10/2016 | Polyulya | G06F 3/0488 |
| 2016/0320915 A1* | 11/2016 | Williamson | G06F 3/0418 |
| 2016/0349893 A1* | 12/2016 | Shimizu | H04N 1/00307 |
| 2017/0279983 A1* | 9/2017 | Mizutani | H04N 1/00411 |
| 2018/0024653 A1* | 1/2018 | Attarian | G06F 3/0383 |
| | | | 345/179 |
| 2018/0232101 A1* | 8/2018 | Fotopoulos | G06F 3/0446 |
| 2019/0018539 A1* | 1/2019 | Zhong | G06F 3/04166 |
| 2019/0121470 A1* | 4/2019 | Roziere | G06F 3/04883 |
| 2019/0265828 A1* | 8/2019 | Hauenstein | G06F 3/0488 |
| 2019/0384453 A1* | 12/2019 | Tanemura | G06F 3/0446 |
| 2020/0285321 A1* | 9/2020 | Ma | G06F 3/017 |
| 2021/0158648 A1* | 5/2021 | Keilwert | G07F 17/3209 |
| 2021/0173431 A1* | 6/2021 | Yang | H04L 67/025 |
| 2022/0113811 A1* | 4/2022 | Tanemura | G06F 3/044 |
| 2022/0121318 A1* | 4/2022 | Chen | G06F 3/0442 |
| 2022/0147173 A1* | 5/2022 | Hauenstein | G06F 3/0488 |

FOREIGN PATENT DOCUMENTS

| | | |
|---|---|---|
| JP | 2016-062410 A | 4/2016 |
| JP | 2017-021827 A | 1/2017 |
| JP | 2017073017 A | 4/2017 |
| JP | 2018061666 A | 4/2018 |

* cited by examiner

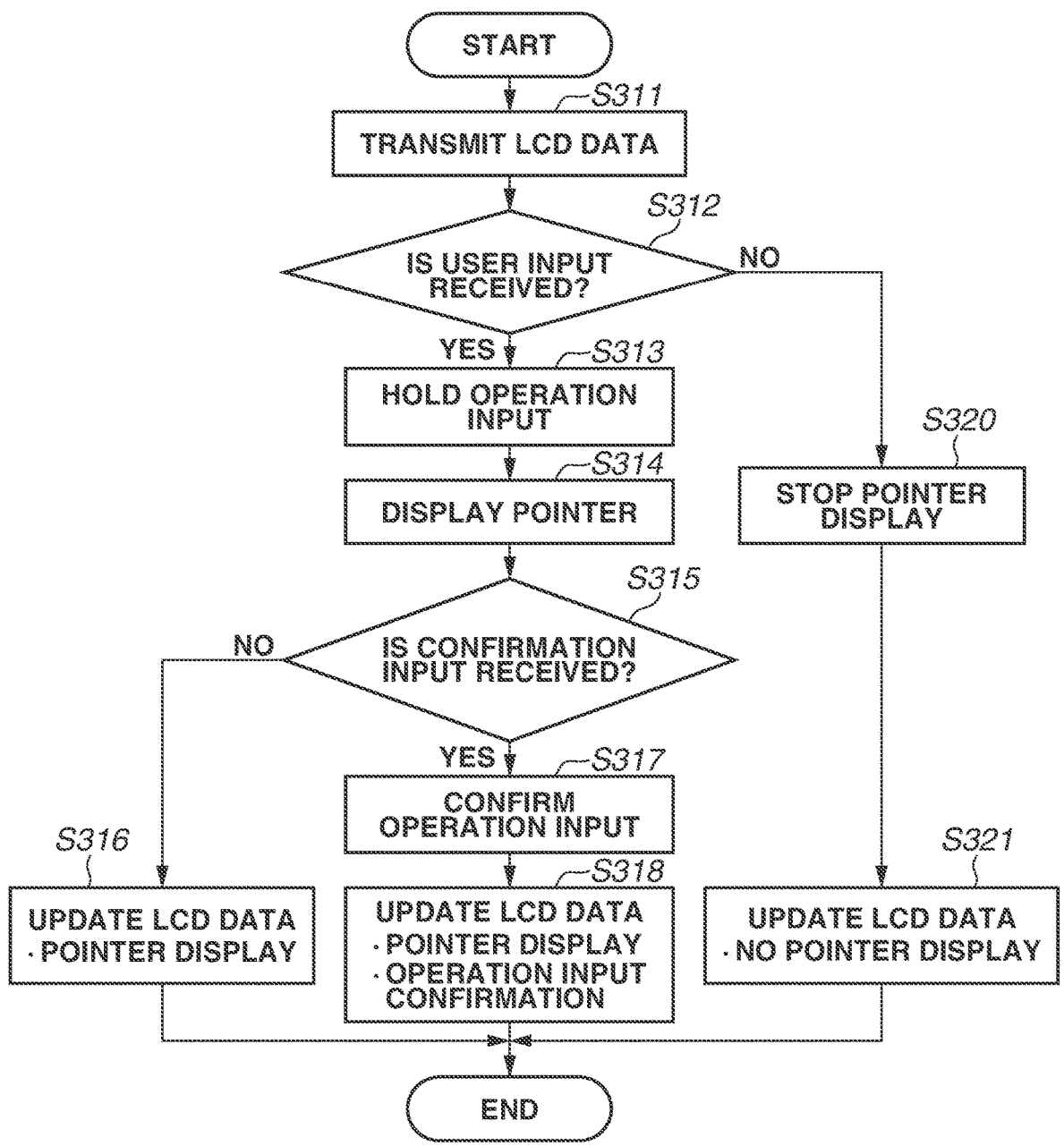

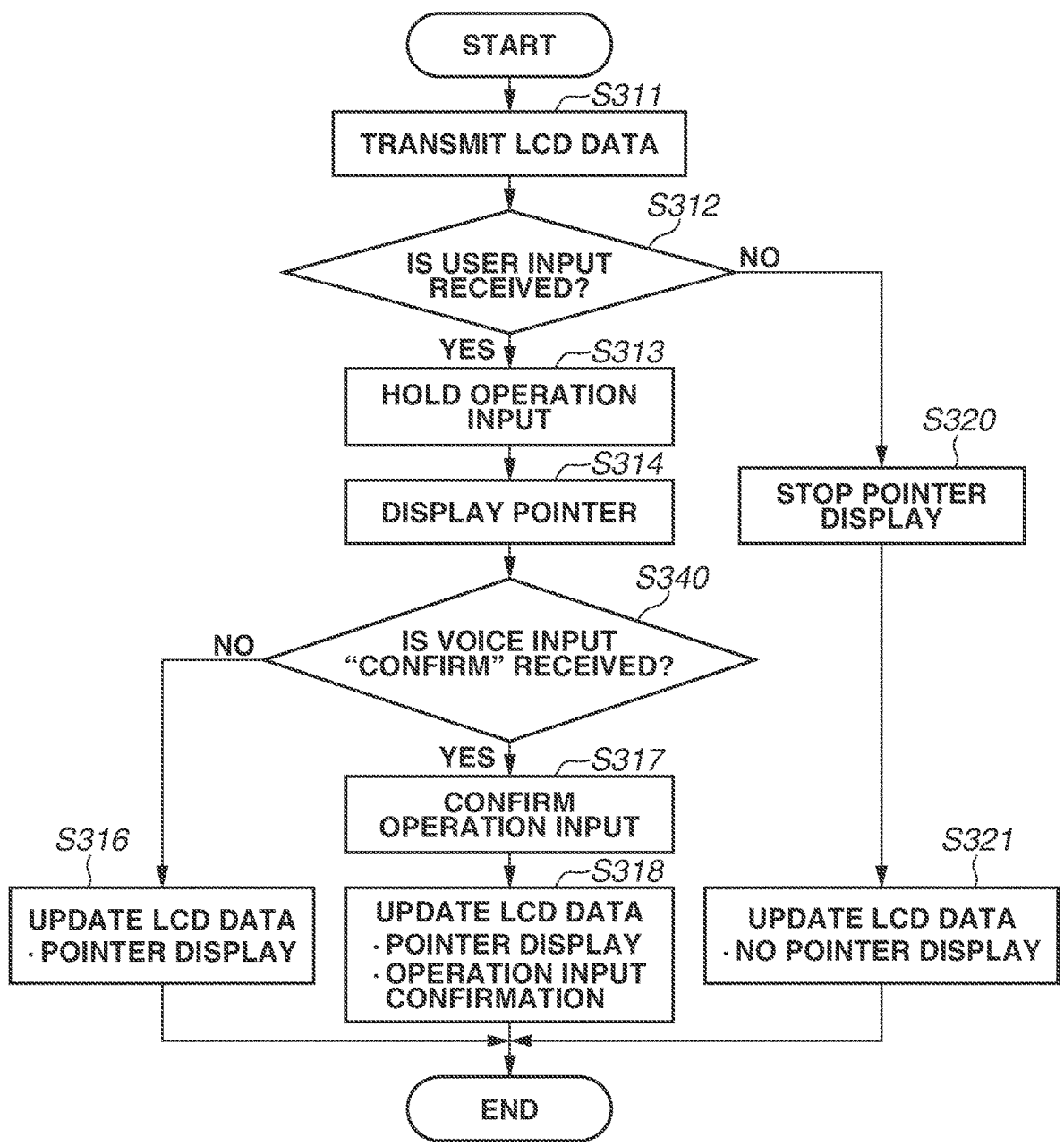

INFORMATION PROCESSING APPARATUS AND METHOD FOR CONTROLLING INFORMATION PROCESSING APPARATUS

BACKGROUND

Field

The present disclosure relates to an information processing apparatus and a method for controlling the information processing apparatus.

Description of the Related Art

One result of the free movement of persons and goods in recent years has resulted in an outbreak of a new virus and variants of the virus instantly spreading across the world resulting in a significant number of infected individuals. Many infectious diseases are known to infect humans through droplet infection. Specifically, a person is infected by inhaling viruses contained in droplets expelled from other infected individuals. Research results have indicated that certain viruses when located on glass and/or plastic surfaces can remain infectious for several days.

This phenomenon has increased the demand for various methods of contactless interaction to avoid as much contact with surfaces harboring viruses as possible. One such surface includes those used to operate electronic devices used by an unspecified number of persons. For example, a multi-function peripheral (MFP), which is an image forming apparatus, is a single apparatus used by multiple users and includes a touch panel display for receiving operations from these users.

Japanese Patent Application Laid-Open No. 2016-62410 discusses an MFP with a touch panel display that detects a contactless input. The touch panel display detects whether a user's finger that is indicated by X-, Y-, and Z-coordinates of a space above a touch panel is relatively close or far. Since the contactless input is confirmed without a physical touch, the user does not experience, for example, click feeling. This can result in the user making multiple inputs, processing proceeding to the next step without input, etc., which can require the user to re-start the desired processing.

Japanese Patent Application Laid-Open No. 2016-62410 is seen to discuss an operation of touching the panel to confirm input. Japanese Patent Application Laid-Open No. 2016-62410 discusses a technology for detecting a hover position of a user's finger to prevent input errors in contactless key input. Proximity is also detected, and an auxiliary display is provided at a nearby position shifted from the hover position based on the proximity so that an input target key is not hidden by the user's finger to prevent input errors. Japanese Patent Application Laid-Open No. 2014-92988 is also seen to discuss an operation of touching the panel to confirm input.

Japanese Patent Application Laid-Open No. 2017-21827 discusses an operation of confirming contactless input in a case where a user's finger hovers a predetermined time or longer at a hover position.

Whether contactless input is confirmed can be difficult for a user to determine due to an absence of a click feeling because a display screen and a user's finger are separated from each other and the finger does not touch an object. In confirming input based on a predetermined time, whether the input is confirmed can also be difficult to determine because it is difficult for the user to synchronize the input with a determination timing of the apparatus. Thus, erroneous user input can occur. Specifically, processing can proceed to a next operation without confirming input and re-starting the processing may become necessary, or input can be redundantly confirmed.

SUMMARY

The present disclosure is directed to a method for clearly confirming contactless input.

According to an aspect of the present disclosure, an information processing apparatus includes a display unit configured to display at least one input object corresponding to data input, a first detection unit configured to detect a position of an object located in a vertical direction with respect to the display unit and that interacts with the display unit in a contactless manner, wherein detecting the position results in detecting an instruction associated with the at least one input object that is displayed on the display unit and corresponds to the position of the object, a second detection unit configured to detect confirmation of the instruction detected by the first detection unit, and an input unit configured to input data corresponding to the at least one input object in a case where the second detection unit detects confirmation of the instruction associated with the at least one input object in a state where the first detection unit detects the instruction associated with the at least one input object.

Further features will become apparent from the following description of exemplary embodiments with reference to the attached drawings.

BRIEF DESCRIPTION OF THE DRAWINGS

FIG. 12 is a flowchart illustrating an operation of confirming user input by the controller unit.

FIG. 19 is a flowchart illustrating an operation of confirming user input by voice recognition by the controller unit.

DESCRIPTION OF THE EMBODIMENTS

Exemplary embodiments will be described in detail below with reference to the attached drawings. The exemplary embodiments described below are not intended to limit the scope of the enclosed claims, and not all combinations of features described in the exemplary embodiments are always essential to implementing a solution of the present disclosure. While an image processing apparatus will be described in the exemplary embodiments as an example of an information processing apparatus, the information processing apparatus is not limited to the image processing apparatus.

Figure 1:
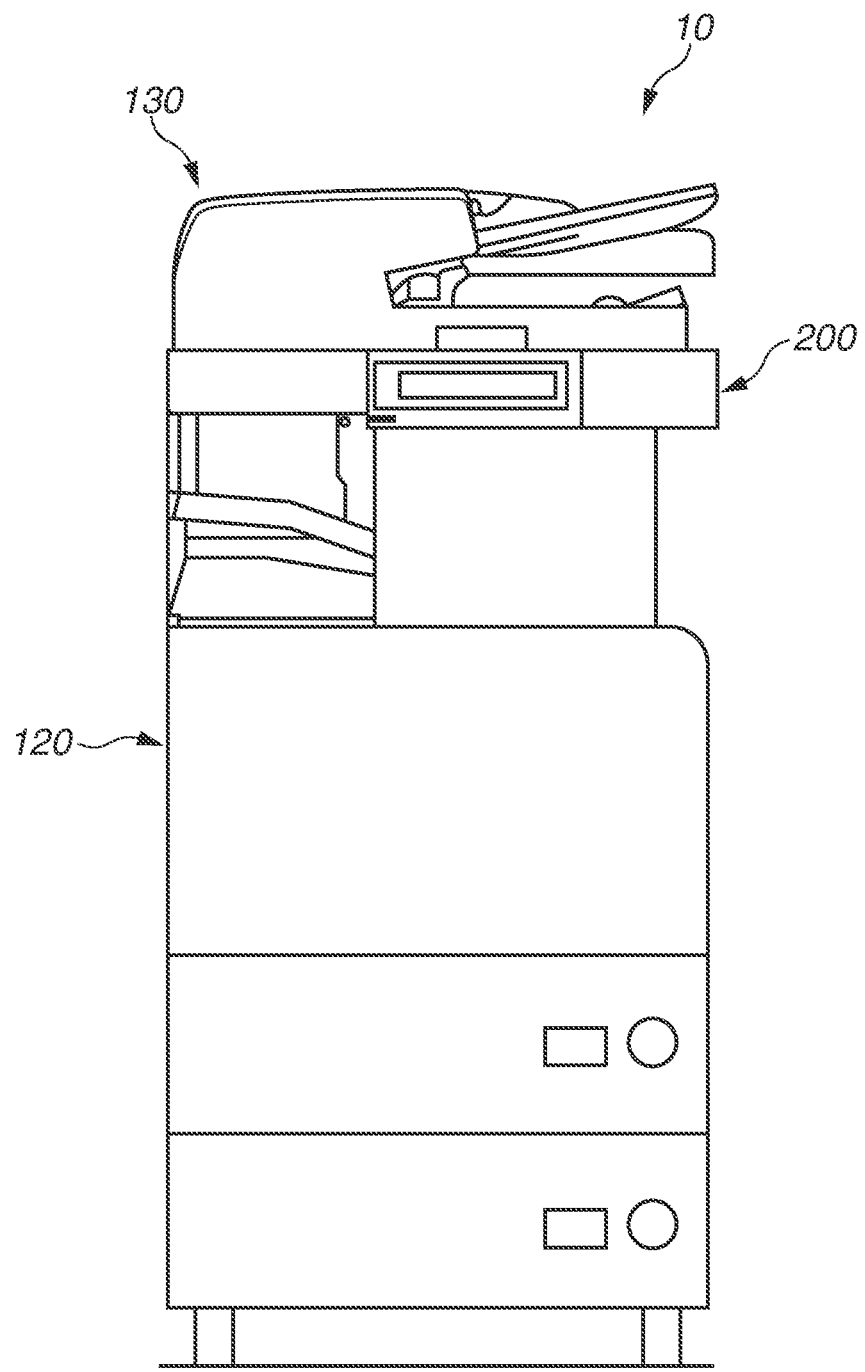
FIG. 1 is a front external view illustrating an image forming apparatus.
Figure 2:
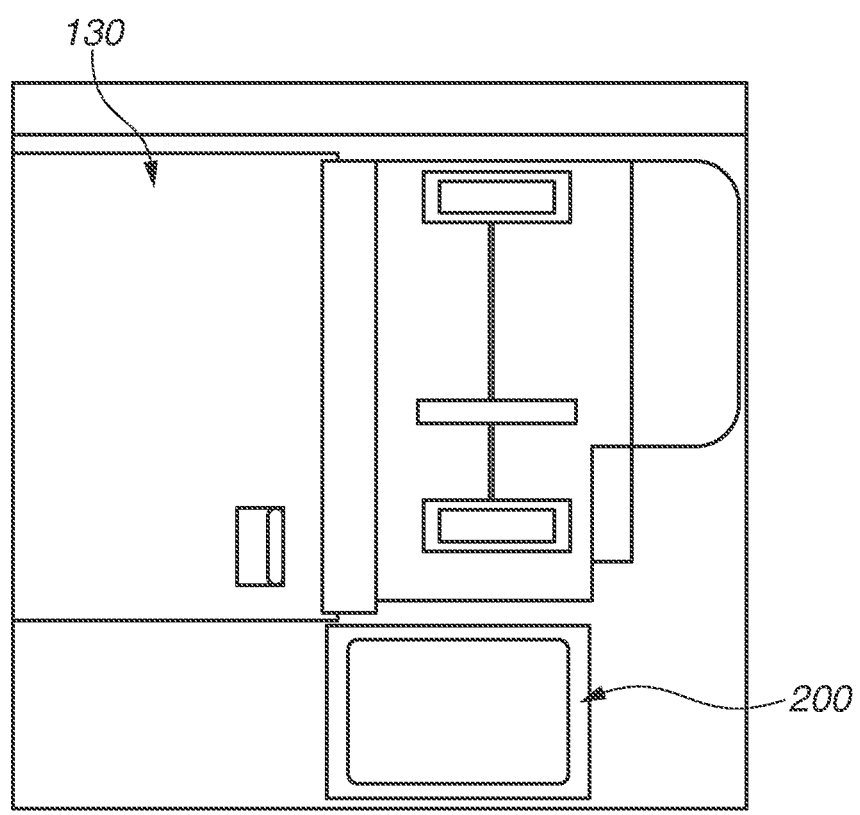
FIG. 2 is a top view illustrating the image forming apparatus.
Figure 3:
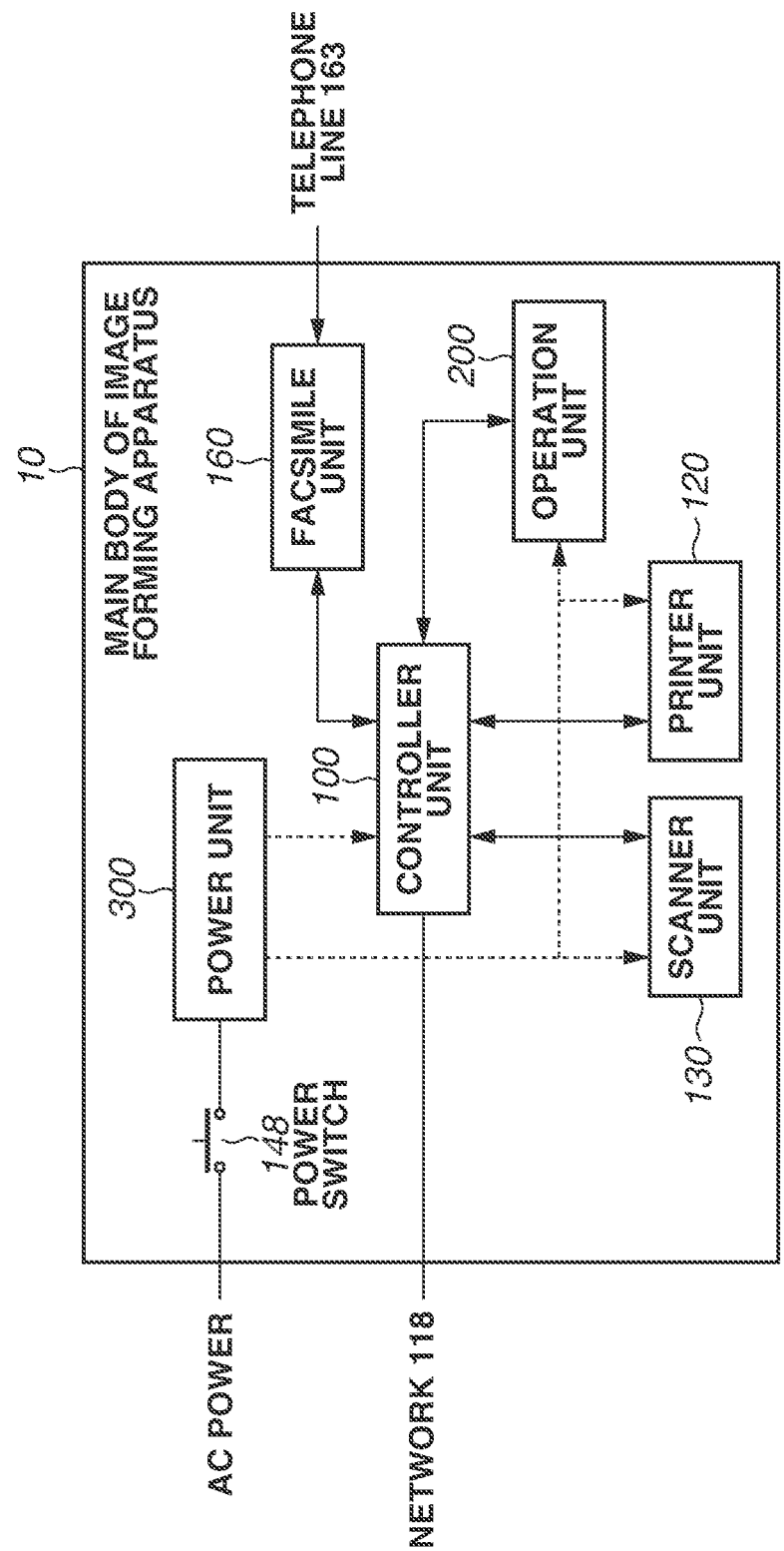
FIG. 3 is a schematic block diagram illustrating the image forming apparatus.

FIG. 1 illustrates an external view of the image forming apparatus, FIG. 2 illustrates a top view of an image forming apparatus 10, and FIG. 3 illustrates a block diagram of the image forming apparatus 10 according to a first exemplary embodiment. The image forming apparatus 10 in the present embodiment is a multi-function peripheral (MFP) device with a plurality of functions such as a print function, a scanner function, and a copy function.

The image forming apparatus 10 includes an operation unit 200, a controller unit 100, a printer unit 120, a scanner unit 130, a power unit 300, a power switch 148, and a facsimile unit 160. The image forming apparatus 10 is connected to a network 118.

The controller unit 100 controls the components of the image forming apparatus 10. A user performs various operations on the image forming apparatus 10 via the operation unit 200. Details of the controller unit 100 and the operation unit 200 will be described below.

The power unit 300 provides power to the components in the image forming apparatus 10. When the power is off, alternating-current (AC) power is insulated by the power switch 148, and when the power switch 148 is turned on, AC power is provided, and the power unit 300 generates direct-current (DC) power. The generated DC power is provided to the components in the image forming apparatus 10.

The scanner unit 130 reads a document and generates monochrome binary image data or color multi-valued image data. The printer unit 120 prints the image data generated by the scanner unit 130 on a sheet. The facsimile unit 160 can transmit and receive digital images to and from a telephone line 163.

Figure 4:
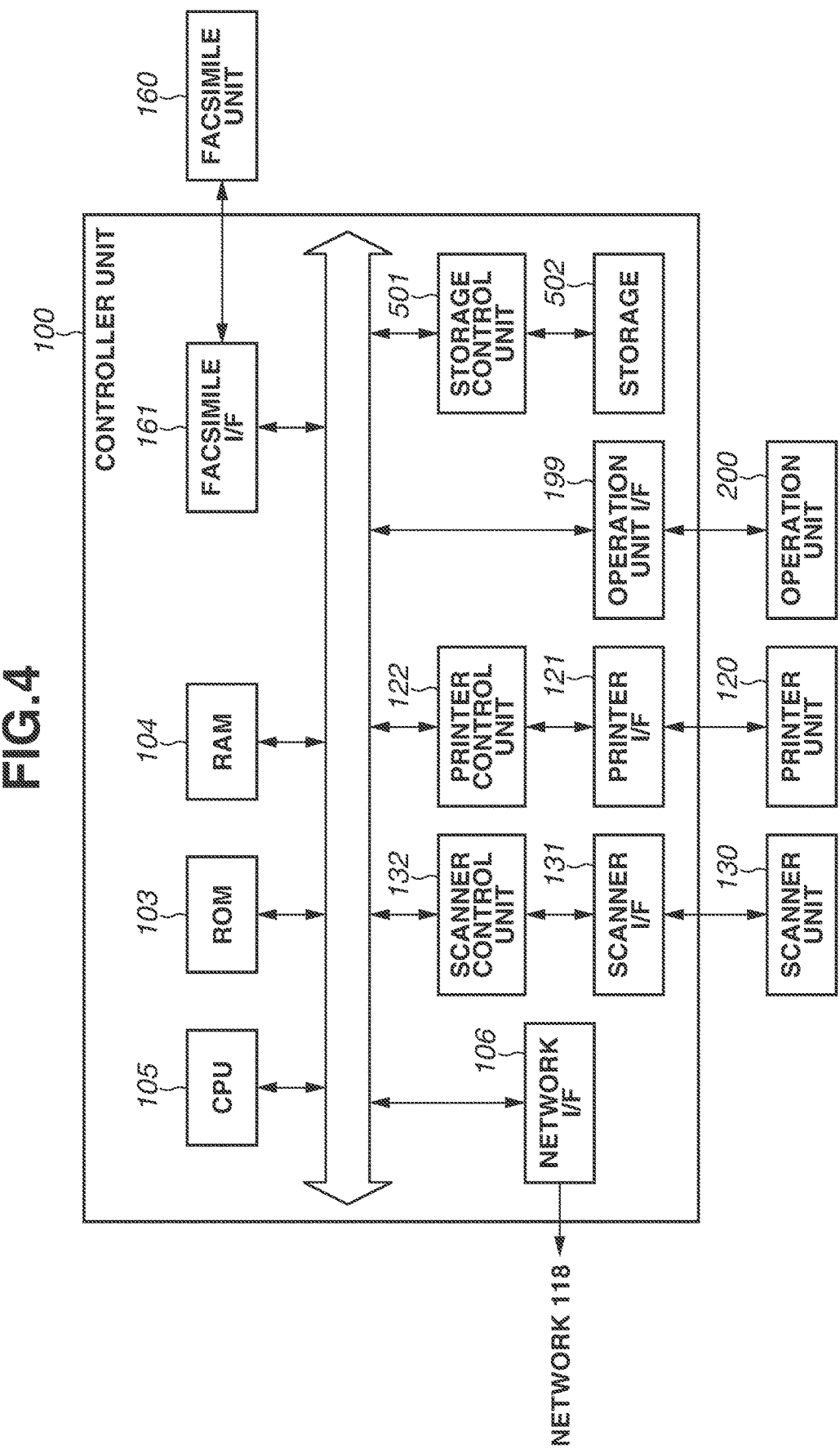
FIG. 4 is a block diagram illustrating a controller unit.

The controller unit 100 will now be described with reference to FIG. 4.

A central processing unit (CPU) 105 executes a software program stored in a random access memory (RAM) 104 and controls the image forming apparatus 10.

A read-only memory (ROM) 103 stores, for example, a program for execution relating to activation of the controller unit 100 and fixed parameters.

The RAM 104 is used to store programs and temporary data by the CPU 105 in controlling the image forming apparatus 10. The programs and temporary data stored in the RAM 104 are read from the ROM 103 or a storage 502 described below.

A printer control unit 122 receives settings information via communication with the CPU 105 and controls operations of the printer unit 120 based on the settings information. The settings information is set by the user via a printer interface (printer I/F) 121 in performing print processing.

A scanner control unit 132 receives settings information via communication with the CPU 105 and controls operations of the scanner unit 130 based on the settings information. The settings information is set by the user via a scanner interface (scanner I/F) 131 in performing scanner processing.

A network interface (network I/F) 106 transmits and receives data to and from the network 118. Specifically, the network I/F 106 receives data transmitted from the network 118 and transmits image data obtained by scanning by the scanner unit 130 and image data stored in the storage 502 to predetermined destinations via the network 118.

A facsimile interface (facsimile I/F) 161 transmits and receives digital image to and from the telephone line 163 via the facsimile unit 160. For example, the facsimile I/F 161 receives image data transmitted from the telephone line 163 via the facsimile unit 160. In another example, the facsimile I/F 161 transmits image data obtained by a scanning operation by the scanner unit 130 and image data stored in the storage 502 to predetermined destinations via the facsimile unit 160 and the telephone line 163.

The storage 502 as a main storage stores programs to be executed by the CPU 105, program management tables, and various types of data. The programs to be executed include a boot program that is executed by the CPU 105 to activate an operating system (OS) in activating the image forming apparatus 10.

Examples of the storage 502 include a hard disk drive (HDD), a solid-state drive (SSD), an embedded multimedia card (eMMC), a NAND flash memory, and a NOR flash memory. The controller unit 100 is connected to the operation unit 200 via an operation unit interface (operation unit I/F) 199.

Figure 5:
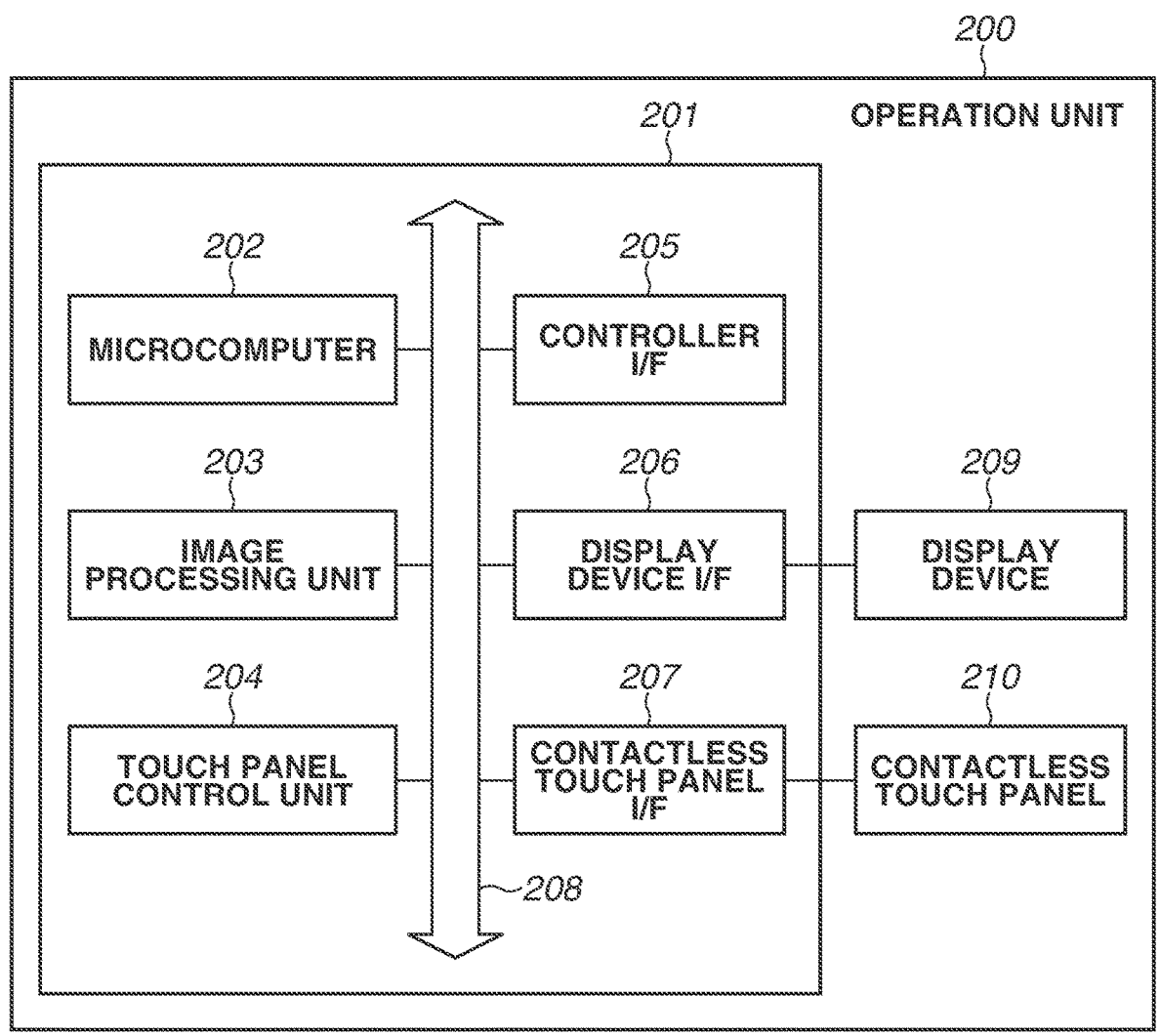
FIG. 5 is a block diagram illustrating an operation unit.

The operation unit 200 will now be described with reference to the block diagram in FIG. 5. The operation unit 200 includes a control board 201, a display device 209, and a contactless touch panel 210.

An image processing unit 203 generates image data for display on the display device 209 and transmits the generated image data to the display device 209 via a display device interface (display device I/F) 206. A touch panel control unit 204 acquires coordinates data from the contactless touch panel 210 and communicates with the controller unit 100 via a controller interface (controller I/F) 205. The controller I/F 205 is connected to the controller unit 100 and is connected to the components of the control board 201 via a system bus 208. The contactless touch panel 210 is superimposed on the display device 209. In a case where the user selects an icon displayed on the display device 209, the contactless touch panel 210 receives the input.

Figure 6:
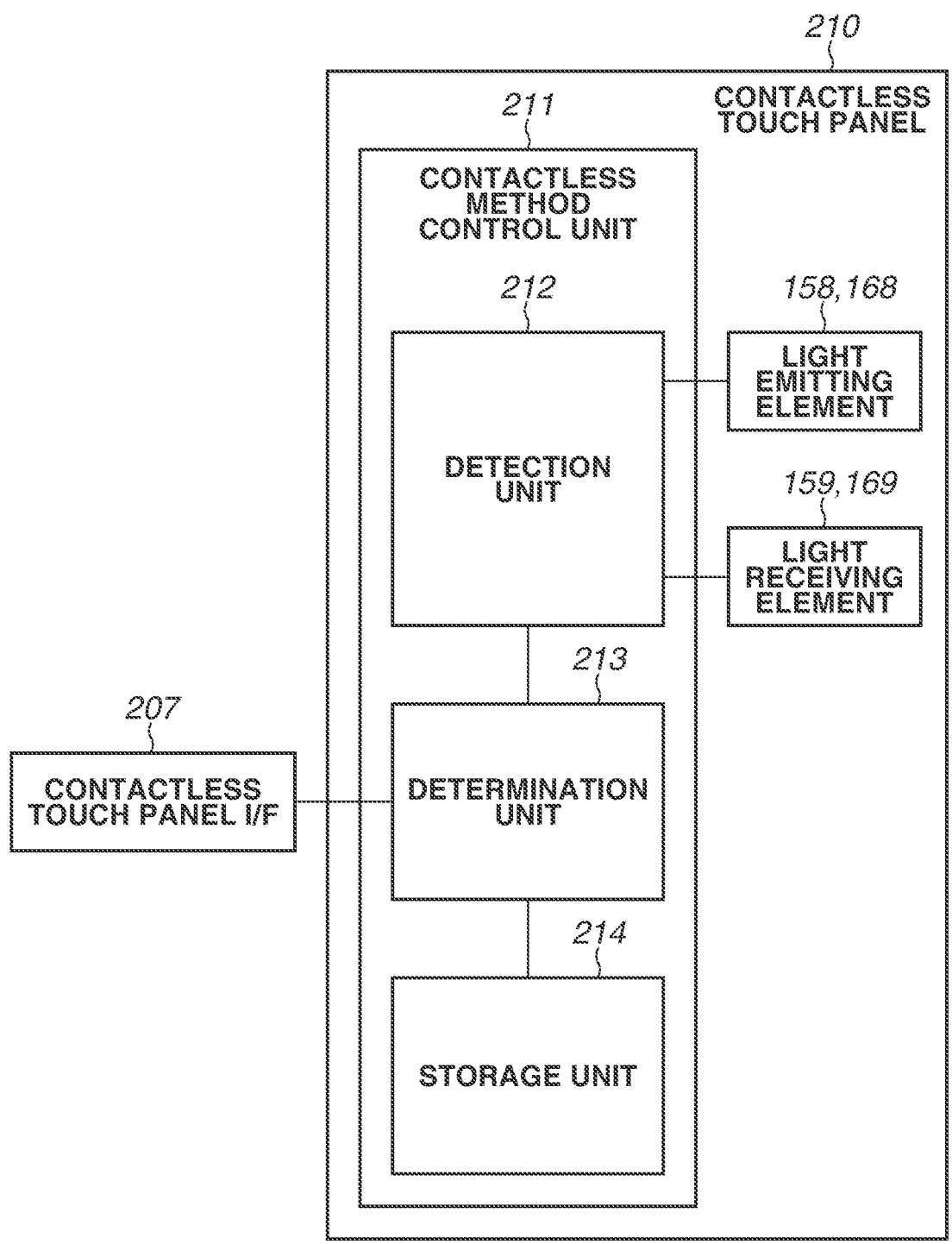
FIG. 6 is a block diagram illustrating an infrared contactless input unit.

An example of the contactless touch panel 210 using an infrared method will be described with reference to FIG. 6. The contactless touch panel 210 includes a control unit 211, light emitting elements 158 and 168, and light receiving elements 159 and 169. The control unit 211 includes a detection unit 212, a determination unit 213, and a storage unit 214.

The detection unit 212 transmits a result of detection of intensities of light received by the light receiving elements 159 and 169 to the determination unit 213. The determination unit 213 stores the intensities of light received by the light receiving elements 159 and 169 and transmitted from the detection unit 212 in the storage unit 214. The determination unit 213 transmits information about coordinates of the light receiving elements 159 and 169 with a change in received light intensities, threshold values, and reference value data to the touch panel control unit 204 of the control board 201 via a touch panel I/F 207. The light emitting elements 158 and 168 consist of, for example, infrared light emitting diodes (infrared LEDs). The plurality of light emitting elements 158 and 168 is located near the display device 209.

The light emitting elements 158 and 168 emit light based on instructions from the detection unit 212. The light emitted from the light emitting elements 158 and 168 is diffracted, shielded, or reflected by a user's finger. The light receiving elements 159 and 169 consist of, for example, photodiodes. The plurality of light receiving elements 159 and 169 located near the display device 209 transmits received light intensities to the detection unit 212.

Figure 7:
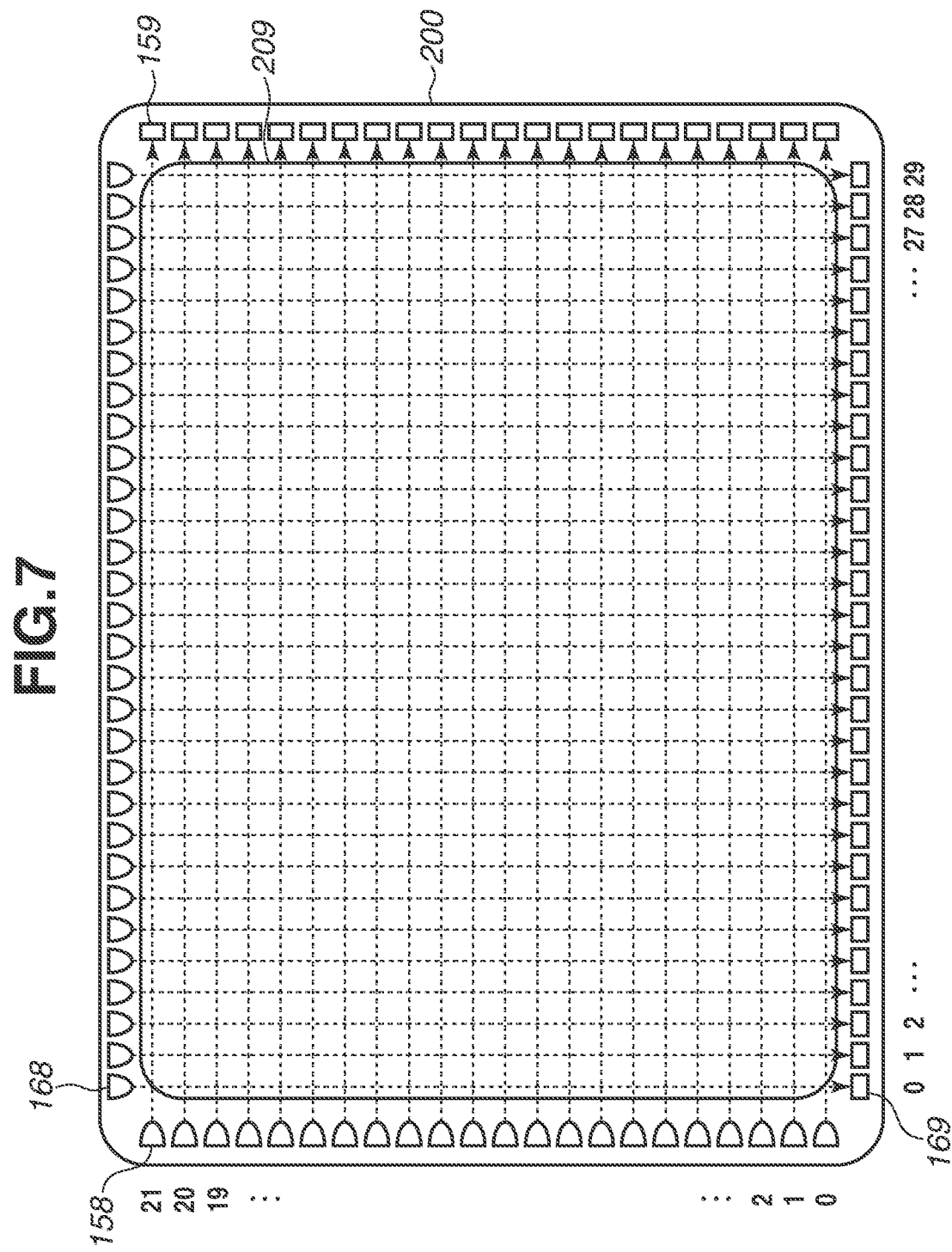
FIG. 7 is a schematic view illustrating an infrared operation unit.

FIG. 7 is a view illustrating the operation unit 200. The display device 209 of the operation unit 200 includes a function of the contactless touch panel 210 that uses an infrared method. The plurality of light emitting elements 158 and 168, such as infrared LEDs, and the plurality of light receiving elements 159 and 169, such as phototransistors, of the contactless touch panel 210 are located opposite each other along an outer frame of the operation unit 200. There is no specific limit to the number of light emitting elements 158 and 168 and the number of light receiving elements 159 and 169 that are provided, and any numbers that enables detection of an operation input and confirmation input by a user's finger is applicable.

Figure 8:
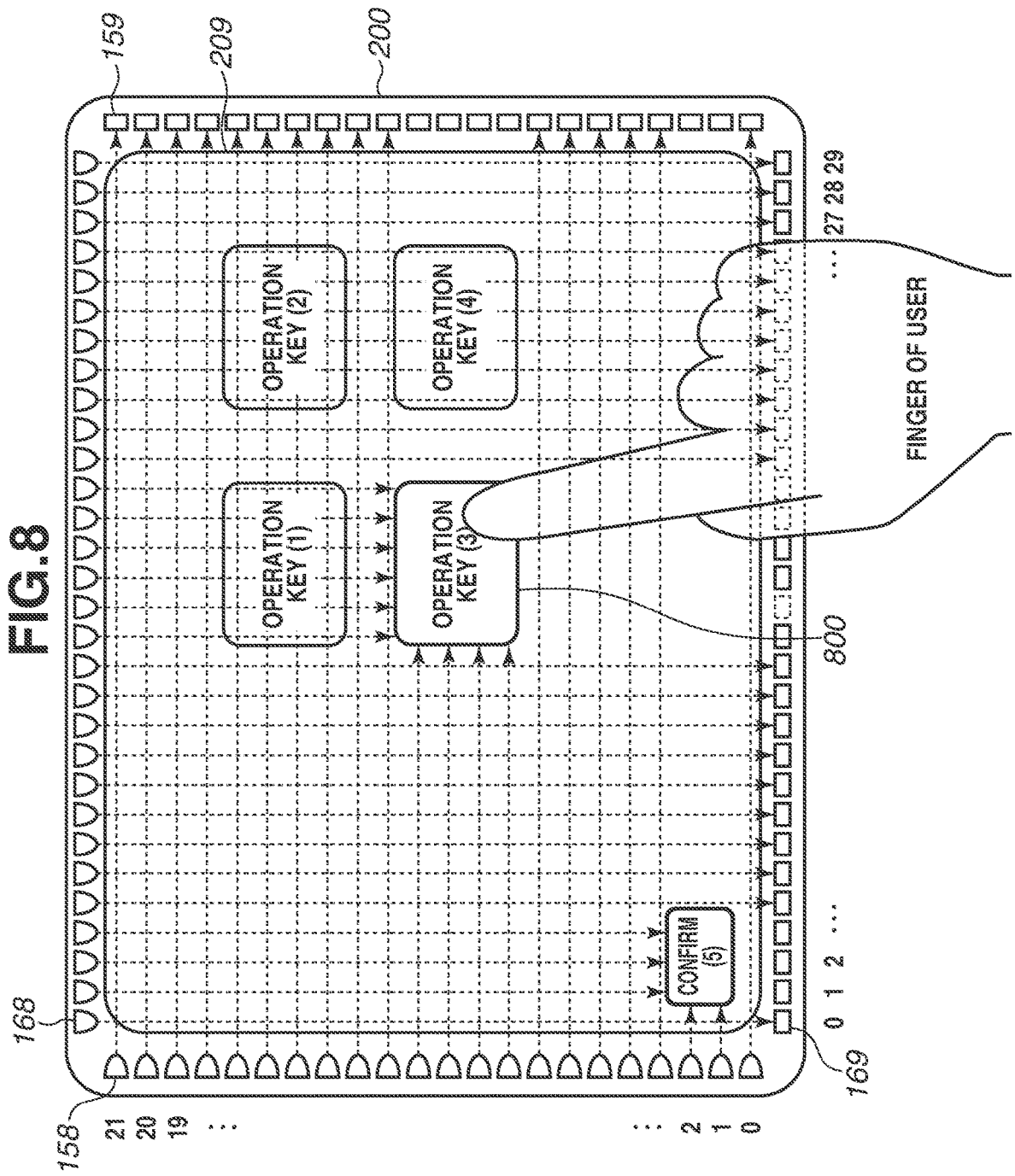
FIG. 8 is a view illustrating contactless input via the infrared operation unit.

In the present exemplary embodiment, twenty-two light emitting elements 158, twenty-two light receiving elements 159, thirty light emitting elements 168, and thirty light receiving elements 169 are provided. A contactless touch detection region of the contactless touch panel 210 is within the display device 209. In a case where the contactless touch panel 210 is operating and invisible light such as infrared light from the light emitting element 158 to the light receiving element 159 and invisible light such as infrared light from the light emitting element 168 to the light receiving element 169 are blocked by a user's finger, the detection unit 212 detects coordinates of a blocked position. For example, as illustrated in FIG. 8, the user's finger is inserted vertically to the contactless touch panel 210 and blocks infrared light from the light emitting elements 158 and 168. This decreases the intensities of the light received by the light receiving elements 169-13 to 169-18 and the light receiving elements 159-8 to 159-11, and it is determined that an "operation key (3) 800" is selected.

Figure 9:
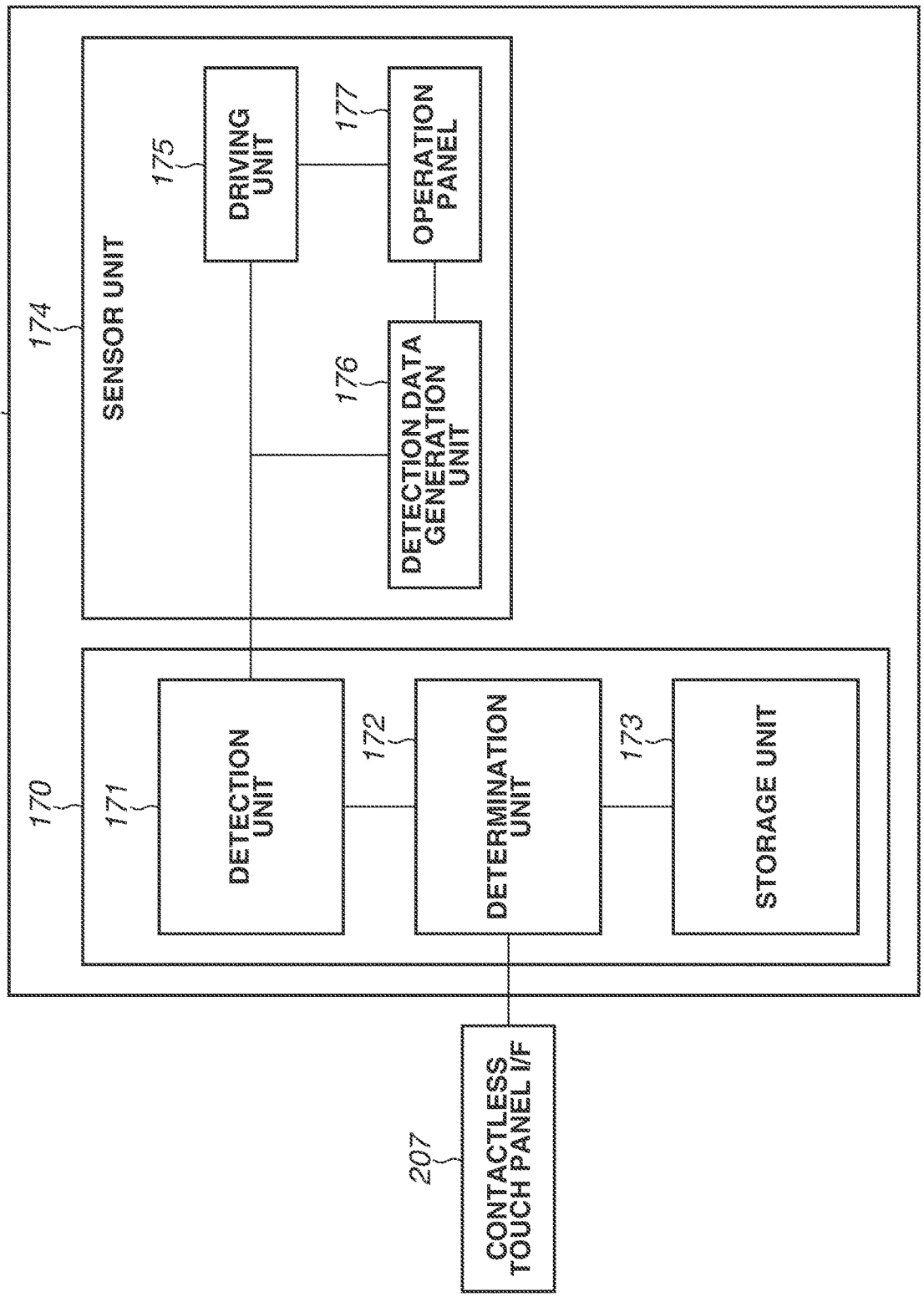
FIG. 9 is a block diagram illustrating a capacitive operation unit.

Next, capacitive contactless input will be described with reference to FIG. 9. FIG. 9 is a diagram illustrating an example of a capacitive touch panel 215 that is included in the operation unit 200.

The touch panel control unit 204 acquires the coordinates data from the capacitive touch panel 215 and communicates with the controller unit 100 via the controller I/F 205. The capacitive touch panel 215 is superimposed on the display device 209. In a case where an operation key displayed on the display device 209 is selected by the user, the capacitive touch panel 215 receives the input. The capacitive touch panel 215 includes a control unit 170 and a sensor unit 174. The control unit 170 includes a detection unit 171, a determination unit 172, and a storage unit 173. The sensor unit 174 includes a driving unit 175, a detection data generation unit 176, and an operation panel 177. The operation panel 177 is used as a user interface for input.

Figure 10:
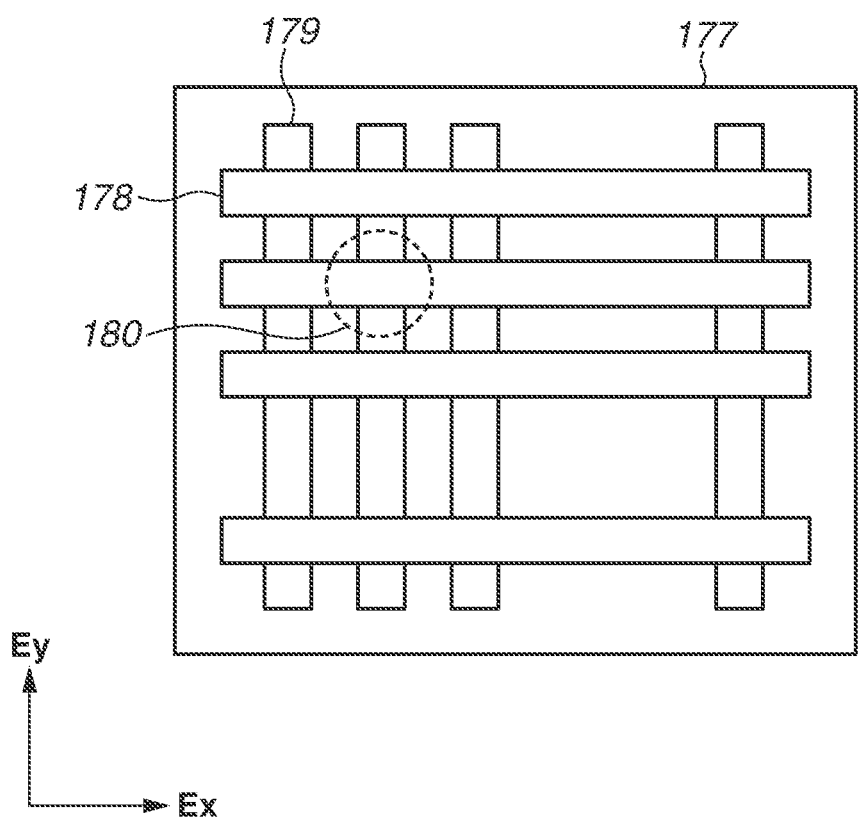
FIG. 10 is a schematic view illustrating an operation panel of the capacitive operation unit.

The operation panel 177 is illustrated in FIG. 10. The operation panel 177 includes a plurality of electrodes Ex 178 extending in a first direction (e.g., X-axis direction) and a plurality of electrodes Ey 179 extending in a second direction (e.g., Y-axis direction) perpendicular to the first direction. The electrodes Ex 178 and the electrodes Ey 179 being insulated from each other intersect with each other, and a capacitive sensor element 180 is formed near each intersection point. The electrodes Ex 178 and the electrodes Ey 179 are not limited to stripe shapes and can be any shape that includes intersection points, such as diamond patterns (rhombic patterns), that enable practice of the present disclosure.

Turning back to FIG. 9, the driving unit 175 applies a driving voltage to each sensor element 180. The driving unit 175, for example, sequentially selects the plurality of electrodes Ex 178 and applies a periodically changing voltage to the selected electrodes Ey 179 based on control by the detection unit 171. The application changes electric potentials of the sensor elements 180, and charges and discharges occur. The electrodes Ey 179 detect electrostatic capacitances of the sensor elements 180 by detecting an amount of electric charges. The electrodes Ey 179 feed the electrostatic capacitances detected at the intersection points of the corresponding rows to the detection data generation unit 176. Detection data is, for example, digital data generated by digital sampling of voltage values corresponding to the electrostatic capacitances at the intersection points. The detection data is provided to the detection unit 171. The detection unit 171 controls the sensor unit 174 to perform the detection periodically at detection positions (the intersection points where the capacitive sensor elements 180 are formed) of the operation panel 177.

Control of the capacitive touch panel 215 includes controlling timings of applying voltages to the electrodes Ey 179 by the driving unit 175 and includes controlling timings of reading detection data from the electrodes Ey 179 by the detection data generation unit 176.

The determination unit 172 stores amounts of change in the electrostatic capacitances at the detection positions on the operation panel 177 in the storage unit 173 based on the detection data received from the sensor unit 174 via the detection unit 171. The storage unit 173 stores reference value data indicating coordinates and electrostatic capacitances of the sensor elements 180 and threshold values including a threshold value T1 for pointer display and a threshold value T2 for contact input.

Figure 11:
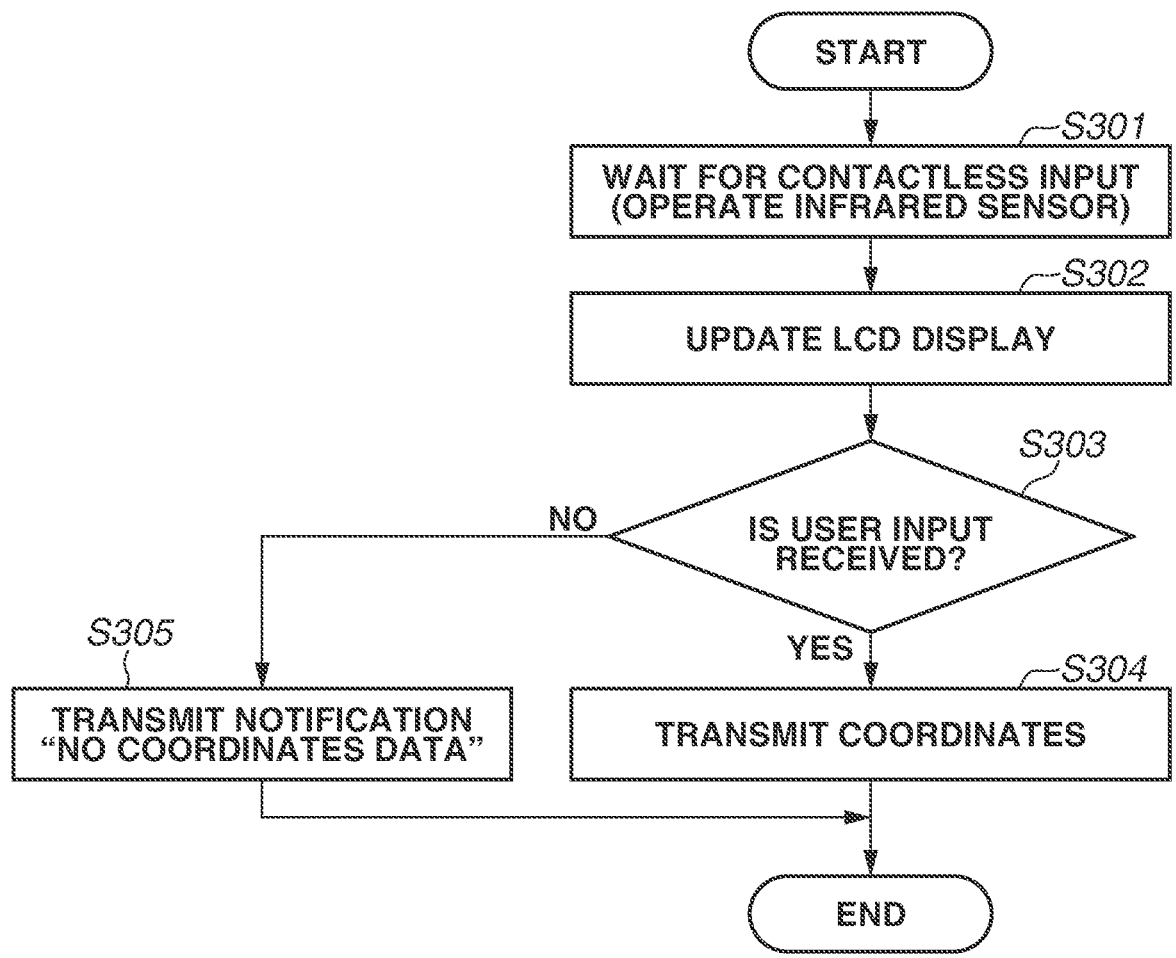
FIG. 11 is a flowchart illustrating an operation of detecting user input by the operation unit.

FIG. 11 is a flowchart illustrating a user input detection operation by the operation unit 200 according to the first exemplary embodiment. In step S301, after activation, the operation unit 200 starts infrared sensor operations for contactless input in order to receive contactless input. Specifically, a microcomputer 202 on the control board 201 operates the display device 209 and the contactless touch panel 210 under control by the touch panel control unit 204. Next, in step S302, the microcomputer 202 updates a liquid crystal display (LCD) by displaying image data generated by the image processing unit 203 on the display device 209 via the display device I/F 206 based on data received from the controller unit 100 via the controller I/F 205.

Next, in step S303, the microcomputer 202 determines whether user input is received. The microcomputer 202 determines the presence/absence of received user input by determining whether coordinate information is received from the contactless touch panel 210 via the contactless touch panel I/F 207 under control of the touch panel control unit 204. In a case where the coordinate information is received (YES in step S303), the processing proceeds to step S304. In a case where no coordinate information is received (NO in step S303), the processing proceeds to step S305. In a case where the microcomputer 202 detects the coordinate information, the coordinate information of the contactless touch panel 210 is cleared, and if next coordinate information is detected, the new coordinate information is stored.

Clearing of the coordinate information is not limited to the above-described case, and in a case where the microcomputer 202 detects an update with new coordinate information, a flag can be provided to indicate the presence/absence of information by turning the flag on/off. In the present exemplary embodiment, the coordinate information is cleared.

Returning to FIG. 8, decreased intensities of light received by the light receiving elements 169-13 to 169-18 and the light receiving elements 159-8 to 159-11, since infrared light from the light emitting elements 158 and 168 is blocked, indicate the presence of a user's finger at an area of coordinate values where the intensities of light have decreased.

In a case where the coordinate values have a range, the determination unit 213 transforms the coordinate values into appropriate values for the area pointed to by a user's finger and stores the transformed values in the storage unit 214. The microcomputer 202 transmits the coordinates of the user input to the microcomputer 202 via the contactless touch panel I/F 207 and ends the operation. In a case where a plurality of regions each with a decrease in received light intensity is detected, a notification of coordinates of each region is transmitted. In the present exemplary embodiment, a maximum number of regions is set to two, and in a case where three or more regions are detected, it is determined that no input is received.

The coordinate information to be notified can include all the coordinates at which an intensity in received light has decreased or values transformed by a predetermined transformation method, as long as the coordinates indicating the user input can be notified. In the present exemplary embodiment, the determination unit 213 calculates a value approximate to an average value of coordinates 8 to 11 of the light receiving element 159, which is 9, and a value approximate to an average value of coordinates 13 to 18 of the light receiving element 169, which is 15, as appropriate values for one region, and obtains the coordinates (9, 15). The determination unit 213 stores the coordinates in the storage unit 214. The microcomputer 202 detects the coordinates stored in the storage unit 214 by polling. In a case where the microcomputer 202 detects the coordinates, the detected coordinates are erased from the storage unit 214 to enable notification of next coordinates.

Turning back to FIG. 11, in step S304, the coordinates (9, 15) are transmitted to the controller unit 100 via the controller I/F 205. The controller unit 100 determines the user input on the "operation key (3)" based on the coordinates (9, 15). The processing then ends.

In step S305, the microcomputer 202 transmits the notification "no coordinates data", and the process ends. The operation unit 200 repeats the user input detection operation while the image forming apparatus 10 operates.

Next, a user input confirmation operation of the controller unit 100 according to the first exemplary embodiment will be described below with reference to the flowchart in FIG. 12.

In step S311, the controller unit 100 transmits LCD data for screen display on the display device 209 of the operation unit 200. The CPU 105 of the controller unit 100 transmits the LCD data to the image processing unit 203 of the operation unit 200 via the operation unit I/F 199. The LCD data corresponding to an entire screen can be transmitted per unit time, or only difference data corresponding to a changed area can be transmitted. In the present exemplary embodiment, the LCD data corresponding to an entire screen is transmitted.

Next, in step S312, it is determined whether user input is received. The CPU 105 determines whether coordinate information indicating the user input detected by the operation unit 200 is received from the operation unit I/F 199. Any method for detecting the presence/absence of coordinate information by which the CPU 105 can recognize the presence/absence can be used, such as interrupt detection or polling detection. In the present exemplary embodiment, the CPU 105 uses the polling detection. The coordinate information is information transmitted from the microcomputer 202 of the operation unit 200 via the controller I/F 205 in step S304 or S305 and stored in the storage 502, and the CPU 105 detects the stored information by polling.

In a case where it is determined in step S312 that user input is received (YES in step S312), in step S313, the CPU 105 holds the operation input obtained from the coordinate information stored in the storage 502. In step S314, a pointer indicating that the operation input is successfully recognized is displayed.

The pointer display can be any display that notifies the user of the recognition of operation input by, for example, placing an arrow mark in the coordinates area, changing the color of the operation key, reversing black and white, etc. In the present exemplary embodiment, black and white are reversed. At this time, a message prompting the user to perform confirmation input can be displayed. The message prompting the confirmation input can be, for example, "please perform confirmation input with the pointer displayed on a key to be selected".

In step S315, the CPU 105 determines whether the confirmation input is received. The confirmation input refers to input on an auxiliary input key displayed in an area corresponding to coordinates (1, 1) to (2, 3) in FIG. 8. The confirmation input is notified as coordinate information about a second region. In a case where two or more pieces of coordinate information are stored in the storage 502, whether the coordinates are within a confirmation input coordinate range is determined. In other words, whether the coordinates of a confirm key are received in a state where the coordinates of the operation key are held is determined.

In a case where coordinate information within the confirmation input coordinate range is received, the CPU 105 determines that the confirmation input is received (YES in step S315), and the processing proceeds to step S317. In a case where no coordinate information within the confirmation input coordinate range is received (NO in step S315), the processing proceeds to step S316.

In step S317, the CPU 105 confirms the held operation input. Confirmation of the operation input is equivalent to a touch in contact input. Specific operations of confirming the operation input will be described below with reference to FIGS. 13A to 13L.

In step S318, the CPU 105 determines that the operation input of the LCD data is confirmed, and the CPU 105 updates the LCD data for which the pointer is displayed in step S314 by including the operation input confirmation in the LCD data. The processing then ends.

In step S316, since no confirmation input is received in step S315, the CPU 105 determines the LCD data for which the pointer is displayed in step S314 as updated data. The processing then ends.

In a case where no user input is received in step S312 (NO in step S312), the processing proceeds to step S320. In step S320, the CPU 105 stops the display of the pointer. In the present exemplary embodiment, the reversed black and white are restored. In step S321, the LCD data after the restoration of the reversed black and white due to the absence of the pointer display is prepared as updated data. The processing then ends. The prepared LCD data is transmitted to the operation unit 200 next time step S311 is performed.

Figure 13A:
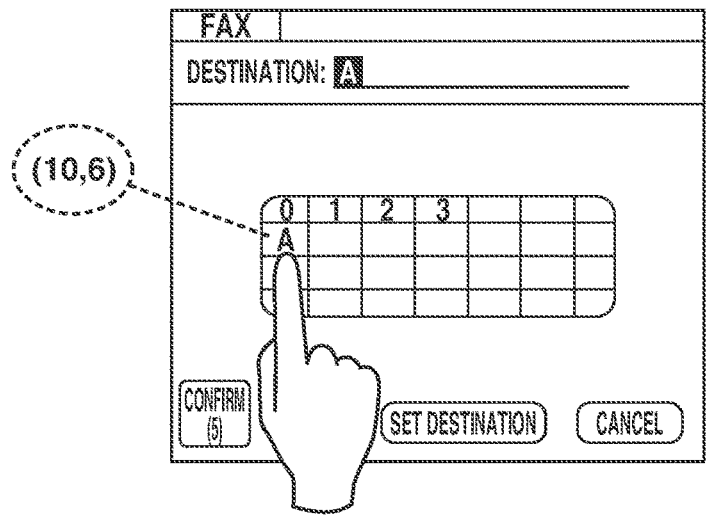
FIGS. 13A to 13L illustrate facsimile destination input operation screens.

Destination input operations in transmitting a facsimile according to the first exemplary embodiment will now be described with reference to FIGS. 13A to 13L, along with specific steps in FIG. 11 and FIG. 12. FIG. 13A illustrates a facsimile destination input screen. A destination input area is in an upper area of the screen, and a virtual keyboard (input object) for data input is in a central area of the screen. The screen also includes a confirmation object (hereinafter, a "confirm" key) for initiating a data input confirmation instruction, a destination set object (hereinafter, a "set destination" key) for initiating a destination set instruction, and a cancel object (hereinafter, "cancel" key) for initiating a cancel instruction. A state where a user's finger is placed over an "A" key and the letter "A" on a black background is displayed in a destination field is illustrated.

In a case where a contactless input detection operation is started, the operation unit 200 receives intensities of light received by the light receiving elements 159 and 169 by the detection unit 212 in step S303 and notifies the determination unit 213 of information about the intensities of the received light. The determination unit 213 calculates coordinates of the user's finger (object) based on the information about the area with a decreased intensity of received light. In the present exemplary embodiment, the coordinates are (10, 6). The determination unit 213 stores the coordinates (10, 6) in the storage unit 214 and notifies the microcomputer 202 of the coordinate information. The microcomputer 202 transmits the coordinates (10, 6) to the storage 502 of the controller unit 100 in step S304.

The CPU 105 of the controller unit 100 detects the presence of the coordinate information from the storage 502 in step S312. The CPU 105 determines that the coordinates (10, 6) correspond to the "A" key from the LCD data, and detects that confirmation input is absent in steps S313 to S315. The CPU 105 adds a black-background letter "A", which indicates that the operation input is recognized, to the LCD data destination input area and updates the LCD data in step S316.

The updated LCD data is transmitted to the operation unit 200 in step S311 in next input detection and received by the operation unit 200 in step S302. The display on the display device 209 is updated, and the black-background letter "A" is displayed in the destination input area.

Figure 13B:
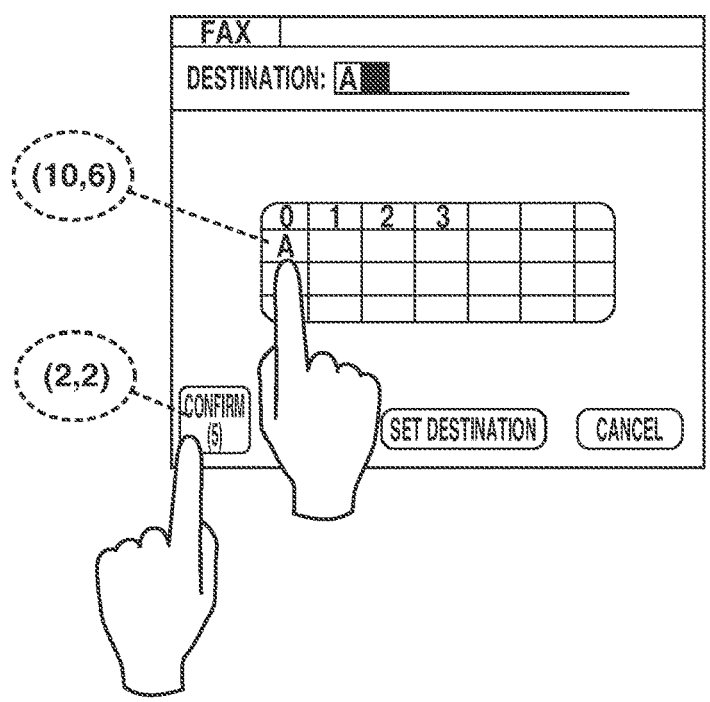

FIG. 13B illustrates a state where a finger of the user's other hand is placed over the confirm key at the lower left. This indicates that the user performs confirmation input using a "confirm (5)" key at the lower left.

The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (10, 6) and (2, 2). The determination unit 213 stores the coordinates (10, 6) and (2, 2) in the storage unit 214 and notifies the microcomputer 202 of the coordinate information. The microcomputer 202 transmits the coordinates (10, 6) and (2, 2) to the storage 502 of the controller unit 100 in step S304.

The CPU 105 of the controller unit 100 detects the presence of the coordinate information from the storage 502 in step S312. The CPU 105 determines that the coordinates (10, 6) correspond to the "A" key from the LCD data, and detects that the coordinates (2, 2) correspond to the "confirm (5)" key in the steps S313 to S315. The CPU 105 determines the coordinates (10, 6) of the "A" key as being input confirmed, changes the "A" key of LCD data to a white-background letter "A", and updates the LCD data with a cursor moved to prepare for next input in steps S317 and S318. As in FIG. 13A, the updated LCD data is transmitted to the operation unit 200 in step S311 in next input detection and received by the operation unit 200 in step S302. The display on the display device 209 is updated, and the white-background letter "A" and the cursor moved to prepare for next input are displayed in the destination input area.

Figure 13C:
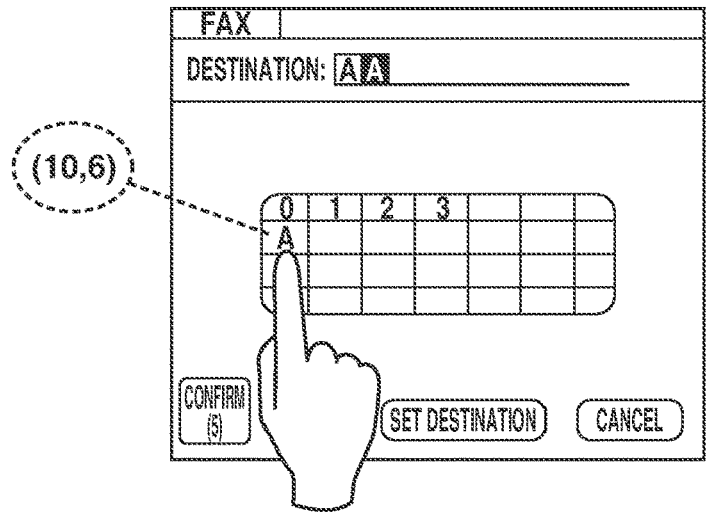

FIG. 13C illustrates a state where the user cancels input using the confirm key at the lower left while maintains input using the "A" key. The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (10, 6).

The determination unit 213 stores the coordinates (10, 6) in the storage unit 214 and notifies the microcomputer 202 of the coordinate information. The microcomputer 202 transmits the coordinates (10, 6) to the storage 502 of the controller unit 100 in step S304.

The CPU 105 of the controller unit 100 detects the presence of the coordinate information from the storage 502 in step S312. The CPU 105 determines that the coordinates (10, 6) correspond to the "A" key from the LCD data, and detects that confirmation input is absent in steps S313 to S315. The CPU 105 adds a black-background letter "A", which indicates that the operation input is recognized, to the LCD data destination input area to display the white-background letter "A" and the black-background letter "A" and updates the LCD data in step S316. As in FIGS. 13A and 13B, the updated LCD data is transmitted to the operation unit 200 in step S311 in next input detection and received by the operation unit 200 in step S302. The display on the display device 209 is updated, and the white-background letter "A" and the black-background letter "A" are displayed in the destination input area.

Figure 13D:
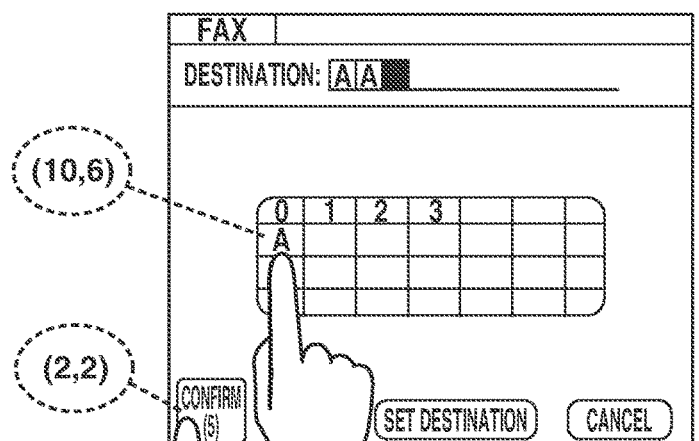

FIG. 13D illustrates a state where a finger of the user's other hand is placed over the confirm key at the lower left as in FIG. 13B. This indicates that the user performs confirmation input using the "confirm (5)" key at the lower left.

The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (10, 6) and (2, 2). The determination unit 213 stores the coordinates (10, 6) and (2, 2) in the storage unit 214 and notifies the microcomputer 202 of the coordinate information. The microcomputer 202 transmits the coordinates (10, 6) and (2, 2) to the storage 502 of the controller unit 100 in step S304. The CPU 105 of the controller unit 100 detects the presence of the coordinate information from the storage 502 in step S312. The CPU 105 determines that the coordinates (10, 6) correspond to the "A"

key from the LCD data, and detects that the coordinates (2, 2) correspond to the "confirm (5)" key in steps S313 to S315. The CPU 105 determines the coordinates (10, 6) of the "A" key as being input confirmed, changes the black-background letter "A" of LCD data to a white-background letter "A", and updates the LCD data with a cursor moved to prepare for next input in steps S317 and S318. As in FIGS. 13A to 13C, the updated LCD data is transmitted to the operation unit 200 in step S311 in next input detection and received by the operation unit 200 in step S302. The display on the display device 209 is updated, and the white-background letters "AA" and the cursor moved to prepare for next input are displayed in the destination input area.

Figure 13E:
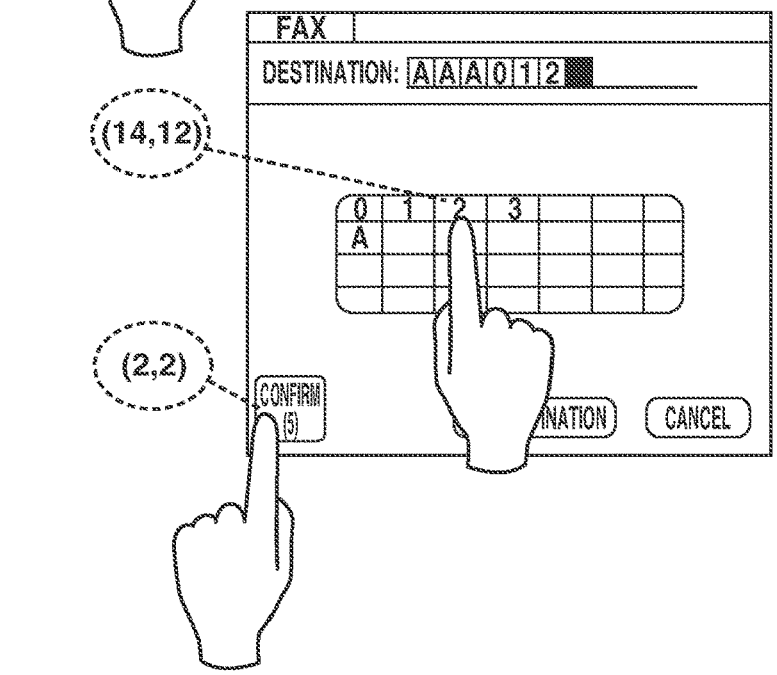

FIG. 13E illustrates a state where the input up to "AAA012" is confirmed by the user who has continued the input of the facsimile destination. The user selects the "2" key using the user's right hand and the confirm key at the lower left using the user's left hand, and the CPU 105 of the controller unit 100 updates the LCD data with the "2" key input of the destination "AAA012" confirmed by the "confirm (5)" key input. As in FIGS. 13A to 13D, the updated LCD data is transmitted to the operation unit 200 in step S311 in next input detection and received by the operation unit 200 in step S302. The display on the display device 209 is updated, and the white-background letters "AAA012" and the cursor moved to prepare for next input are displayed in the destination input area.

Figure 13F:
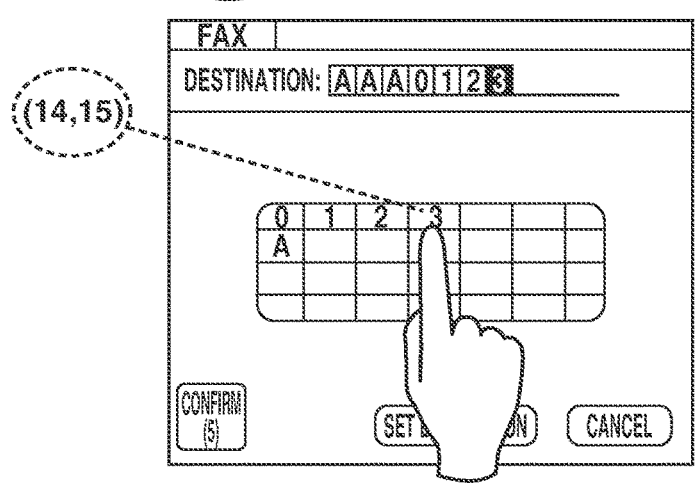

FIG. 13F illustrates a state where the user cancels input of the confirm key at the lower left and selects a "3" key. The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (14, 15). The determination unit 213 stores the coordinates (14, 15) in the storage unit 214 and notifies the microcomputer 202 of the coordinate information. The microcomputer 202 transmits the coordinates (14, 15) to the storage 502 of the controller unit 100 in step S304.

The CPU 105 of the controller unit 100 detects the presence of the coordinate information from the storage 502 in step S312. The CPU 105 determines that the coordinates (14, 15) correspond to the "3" key from the LCD data, and detects that confirmation input is absent in steps S313 to S315. The CPU 105 adds a black-background letter "3", which indicates that the operation input is recognized, to the LCD data destination input area to display the white-background letters "AAA012" and the black-background letter "3" and updates the LCD data in step S316.

As in FIGS. 13A to 13E, the updated LCD data is transmitted to the operation unit 200 in step S311 in next input detection and received by the operation unit 200 in step S302. The display on the display device 209 is updated, and the white-background letters "AAA012" and the black-background letter "3" are displayed in the destination input area.

Figure 13G:
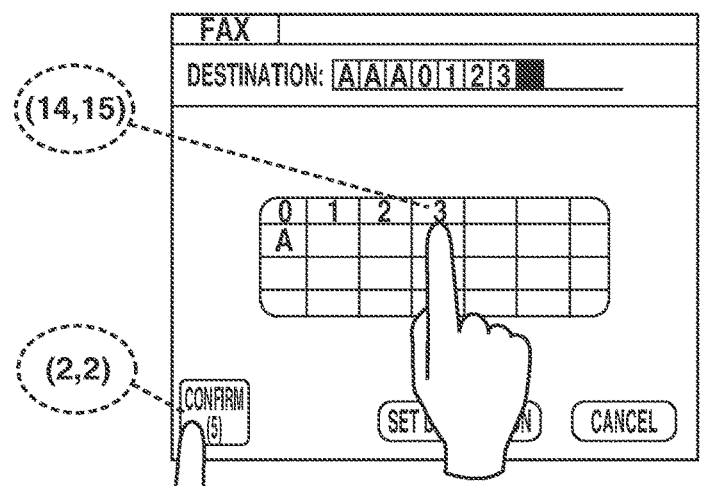

FIG. 13G illustrates a state where a finger of the user's other hand is placed over the confirm key at the lower left. This indicates that the user performs confirmation input using the "confirm (5)" key at the lower left. The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (14, 15) and (2, 2).

The determination unit 213 stores the coordinates (14, 15) and (2, 2) in the storage unit 214 and notifies the microcomputer 202 of the coordinate information. The microcomputer 202 transmits the coordinates (14, 15) and (2, 2) to the storage 502 of the controller unit 100 in step S304. The CPU 105 of the controller unit 100 detects the presence of the coordinate information from the storage 502 in step S312. The CPU 105 determines that the coordinates (14, 15) correspond to the "3" key from the LCD data, and detects that the coordinates (2, 2) correspond to the "confirm (5)" key in steps S313 to S315. The CPU 105 determines the coordinates (14, 15) of the "3" key as being input confirmed, changes the letter "3" to a white-background letter "3", and updates the LCD data with the cursor moved to prepare for next input in steps S317 and S318. As in FIGS. 13A to 13F, the updated LCD data is transmitted to the operation unit 200 in step S311 in next input detection. The updated LCD data is received by the operation unit 200 in step S302. The display on the display device 209 is updated, and the white-background letters "AAA0123" and the cursor moved to prepare for next input are displayed in the destination input area.

Figure 13H:
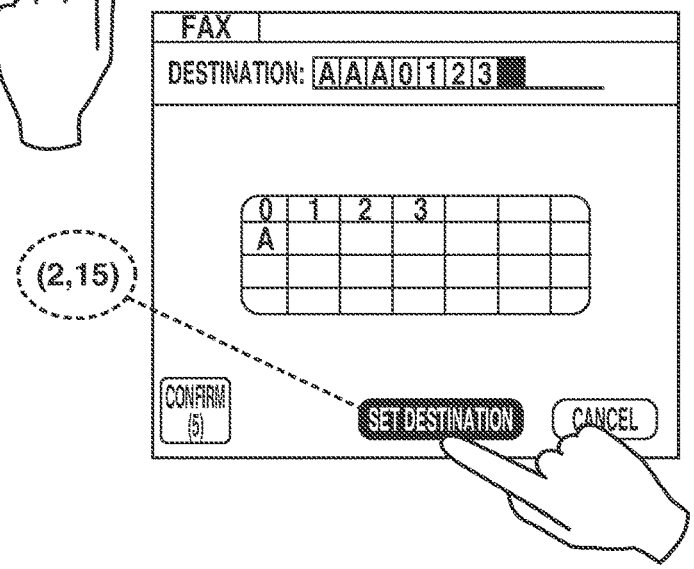

FIG. 13H illustrates a state where the user performs input to set the destination. The user cancels input of the confirm key at the lower left and selects a "set destination" key.

The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (2, 15). The determination unit 213 stores the coordinates (2, 15) in the storage unit 214 and notifies the microcomputer 202 of the coordinate information. The microcomputer 202 transmits the coordinates (2, 15) to the storage 502 of the controller unit 100 in step S304. The CPU 105 of the controller unit 100 detects the presence of the coordinate information from the storage 502 in step S312. The CPU 105 determines that the coordinates (2, 15) correspond to the "set destination" key from the LCD data, and detects that confirmation input is absent in steps S313 to S315.

The CPU 105 reverses black and white of the "set destination" key, which indicates that the operation input is recognized, and updates the LCD data in step S316. As in FIGS. 13A to 13F, the updated LCD data is transmitted to the operation unit 200 in step S311 in next input detection and received by the operation unit 200 in step S302. The display on the display device 209 is updated, and the "set destination" key is displayed with black and white reversed.

Figure 13I:
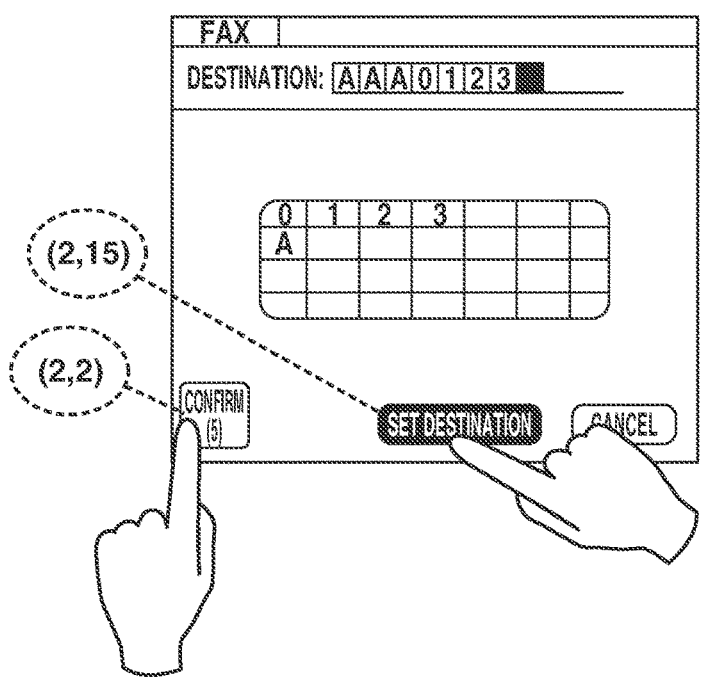

FIG. 13I illustrates a state where a finger of the user's other hand in FIG. 13H is placed over the confirm key at the lower left. This indicates that the user performs confirmation input using the "confirm (5)" key at the lower left.

The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (2, 15) and (2, 2). The determination unit 213 stores the coordinates (2, 15) and (2, 2) in the storage unit 214 and notifies the microcomputer 202 of the coordinate information. The microcomputer 202 transmits the coordinates (2, 15) and (2, 2) to the storage 502 of the controller unit 100 in step S304. The CPU 105 of the controller unit 100 detects the presence of the coordinate information from the storage 502 in step S312. The CPU 105 determines that the coordinates (2, 15) correspond to the "set destination" key from the LCD data, and detects that the coordinates (2, 2) correspond to the "confirm (5)" key in steps S313 to S315.

Figure 13J:
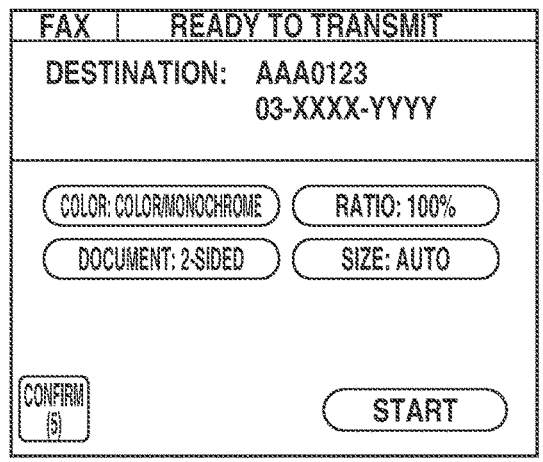

The CPU 105 determines the coordinates (2, 15) of the "set destination" key as being input confirmed, and updates the LCD data to a screen for transmitting a facsimile to the input destination AAA0123 in steps S317 and S318. As in FIGS. 13A to 13H, the updated LCD data is transmitted to the operation unit 200 in step S311 in next input detection and received by the operation unit 200 in step S302. The display on the display device 209 is updated, and a facsimile transmission screen in FIG. 13J is displayed. In the present exemplary embodiment, other pieces of input information (e.g., phone number, various settings) necessary for transitioning to the facsimile transmission screen are input in advance by a similar method. In a case where other pieces of input information is missing, an operation of transitioning to a screen for inputting the missing input information is performed.

Figure 13K:
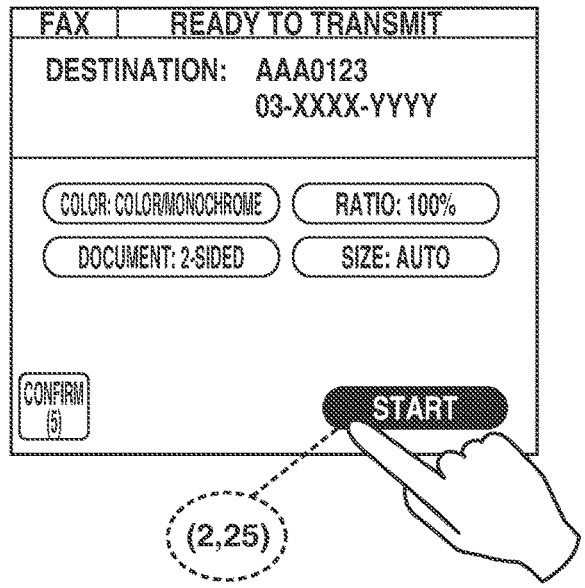

FIG. 13K illustrates a state where the user selects a "start" key for starting facsimile transmission on the facsimile transmission screen in FIG. 13J.

The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (2, 25). The determination unit 213 stores the coordinates (2, 25) in the storage unit 214 and notifies the microcomputer 202 of the coordinate information. The microcomputer 202 transmits the coordinates (2, 25) to the storage 502 of the controller unit 100 in step S304.

The CPU 105 of the controller unit 100 detects the presence of the coordinate information from the storage 502 in step S312. The CPU 105 determines that the coordinates (2, 25) correspond to the "start" key from the LCD data, and detects that confirmation input is absent in steps S313 to S315. The CPU 105 reverses black and white of the "start" key, which indicates that the operation input is recognized, and updates the LCD data in step S316. As in FIGS. 13A to 13J, the updated LCD data is transmitted to the operation unit 200 in step S311 in next input detection and received by the operation unit 200 in step S302. The display on the display device 209 is updated, and the "start" key is displayed with black and white reversed.

Figure 13L:
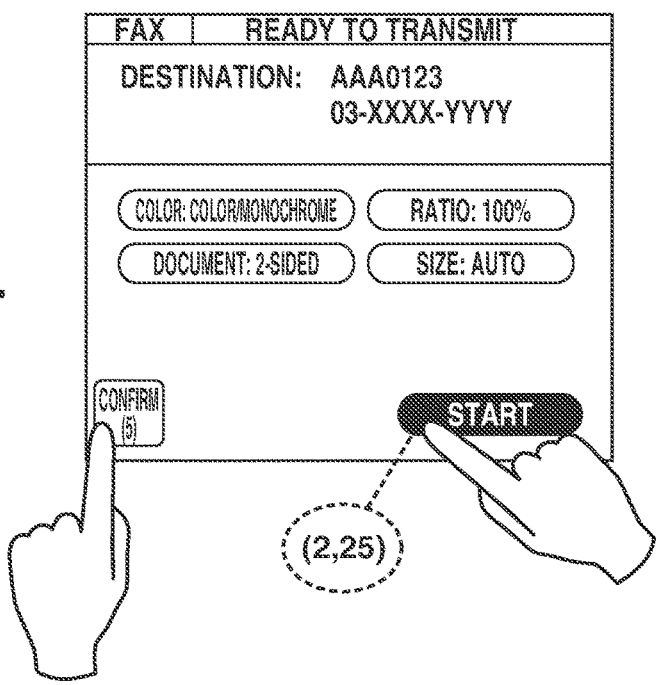

FIG. 13L illustrates a state where a finger of the user's other hand in FIG. 13K is placed over the confirm key at the lower left. This indicates that the user performs confirmation input using the "confirm (5)" key at the lower left.

The detection unit 212 of the operation unit 200 receives intensities of light received by the light receiving elements 159 and 169 in step S303 and notifies the determination unit 213 of information about the intensities of the received light. The determination unit 213 calculates coordinates of the user's finger based on the information about the area with a decreased intensity of received light. In the present exemplary embodiment, the coordinates are (2, 25) and (2, 2). The determination unit 213 stores the coordinates (2, 25) and (2, 2) in the storage unit 214 and notifies the microcomputer 202 of the coordinate information. The microcomputer 202 transmits the coordinates (2, 25) and (2, 2) to the storage 502 of the controller unit 100 in step S304.

The CPU 105 of the controller unit 100 detects the presence of the coordinate information from the storage 502 in step S312. The CPU 105 determines that the coordinates (2, 25) correspond to the "start" key from the LCD data, and detects that the coordinates (2, 2) correspond to the confirm (5) key in steps S313 to S315. The CPU 105 determines the coordinates (2, 25) of the "start" key as being input confirmed and performs a facsimile transmission operation in steps S317 and S318.

The "start" key is also used in performing a copy operation on a copy screen. As with the "start" key operation in facsimile transmission, a finger is placed over the "start" key, black and white are reversed, and then another finger is placed over the "confirm (5)" key to perform the copy operation.

As described above, in the present exemplary embodiment, input is confirmed by acquiring the coordinates of the confirm key as confirmation information in a state where the coordinates of the operation key are held. With this configuration, unintended multi-input and input errors, e.g., the processing proceeds to a next operation with the input being unset, are prevented.

Figure 14:
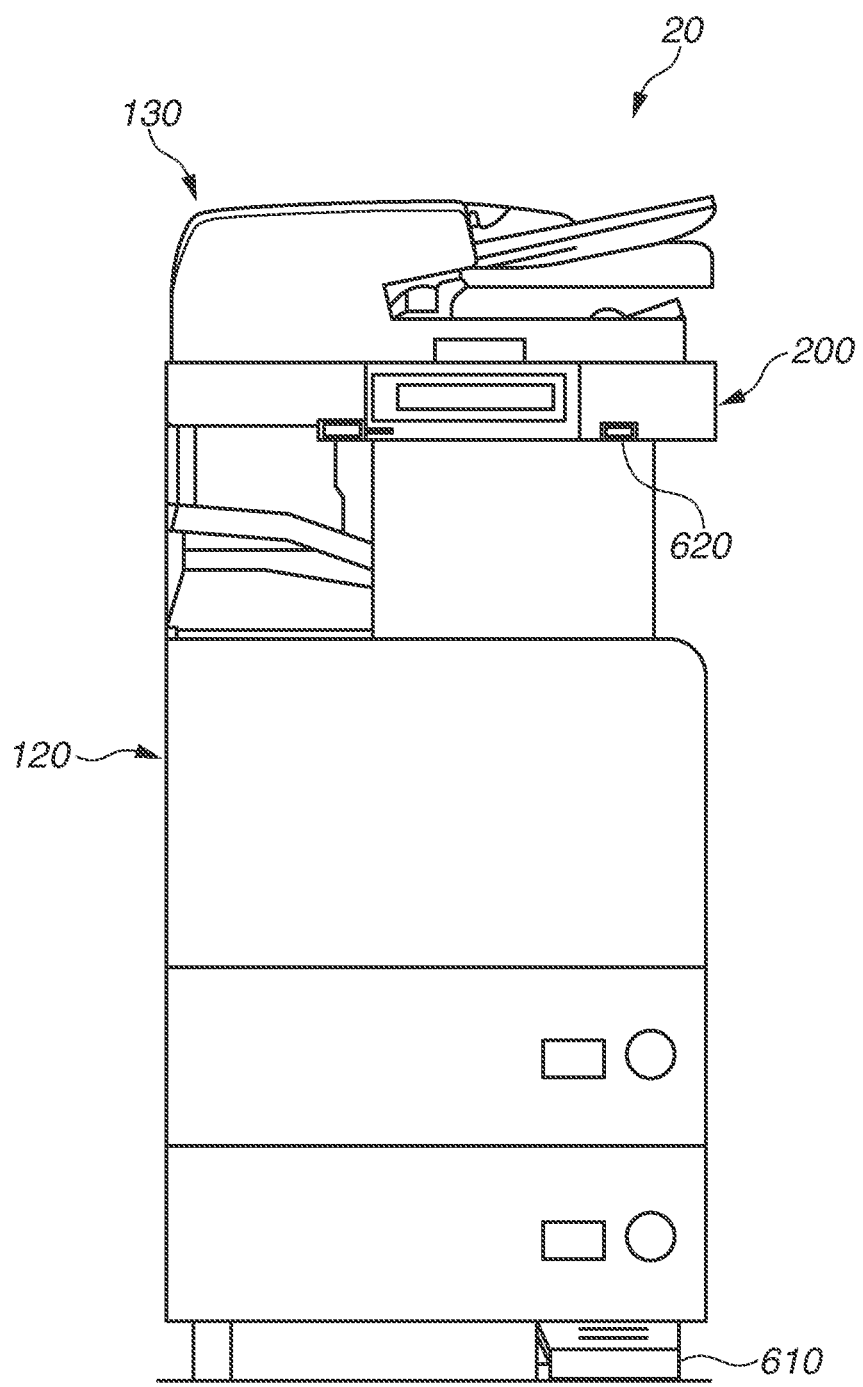
FIG. 14 is a front external view illustrating an image forming apparatus.
Figure 15:
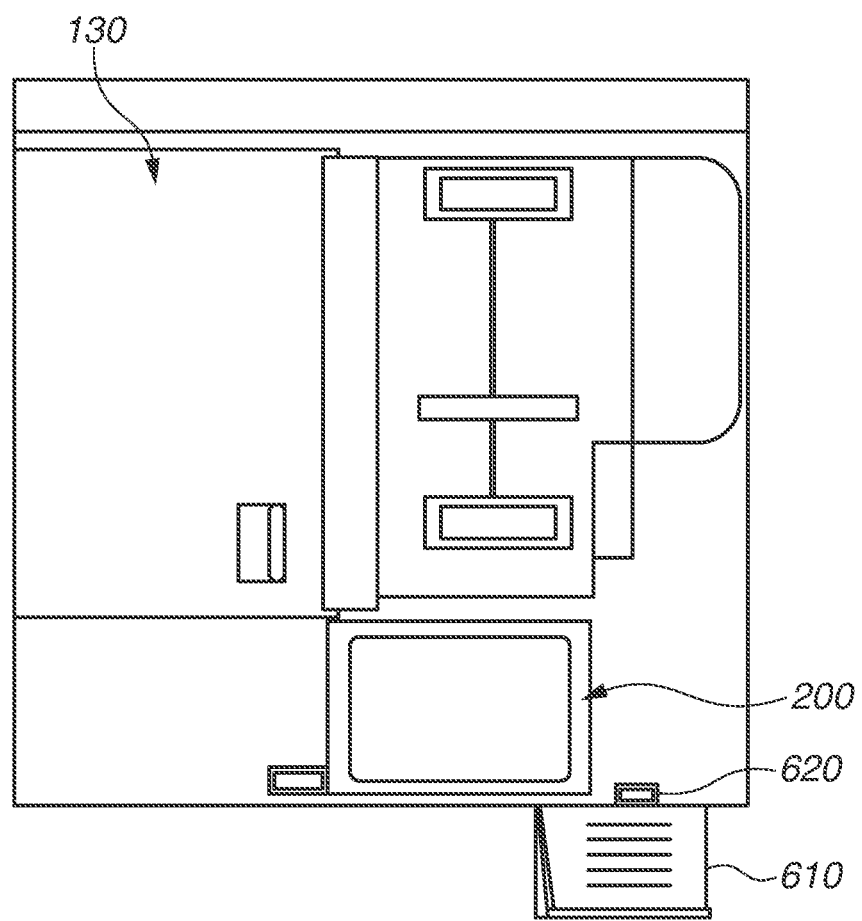
FIG. 15 is a top view illustrating the image forming apparatus.

A second exemplary embodiment will be described below. FIG. 14 is an external view and FIG. 15 is a top view, illustrating an image forming apparatus 20 according to the second exemplary embodiment. The present exemplary embodiment is different than the first exemplary embodiment in that input is confirmed by inputting confirmation information using a microphone or a foot switch in a state where coordinates of an operation key are held. Other aspects of the present embodiment are similar to those of the first exemplary embodiment, and thus redundant descriptions thereof are omitted.

Each component of the image forming apparatus 20 that is identical to a component of the image forming apparatus 10 is indicated with the same reference numeral as that of the corresponding component, and detailed descriptions of these identical components are omitted herein. In the present exemplary embodiment, a component indicated with a different reference numeral will be described below.

Figure 16:
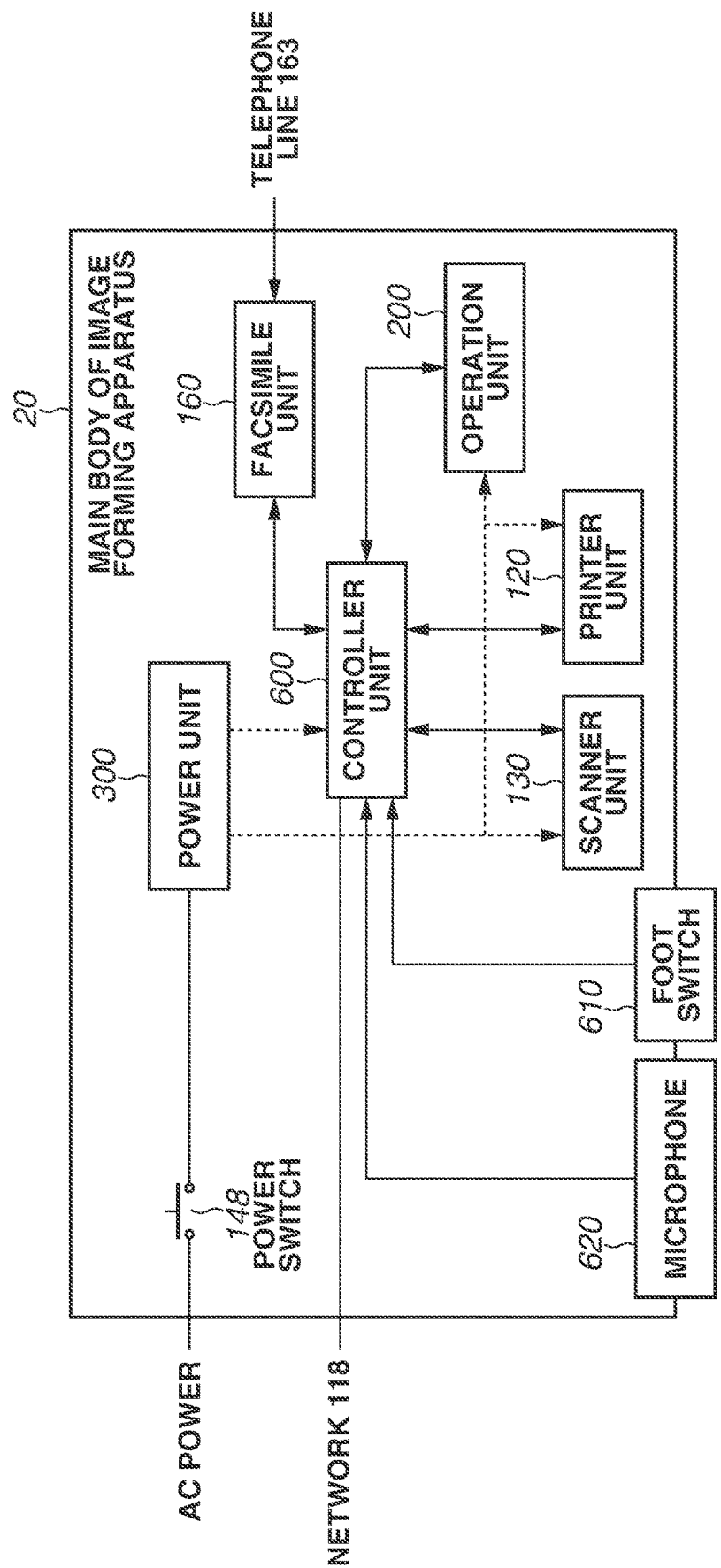
FIG. 16 is a schematic block diagram illustrating the image forming apparatus.

The image forming apparatus 20 includes a microphone 620 as a voice recognition device, where the microphone 620 receives user voices. The image forming apparatus 20 is turned on by a user stepping on a foot switch 610. The microphone 620 and foot switch 610 can be connected to the image forming apparatus 20 either physically or via network interface. FIG. 16 is a block diagram illustrating the image forming apparatus 20. The foot switch 610 and the microphone 620 are connected to a controller unit 600.

Figure 17:
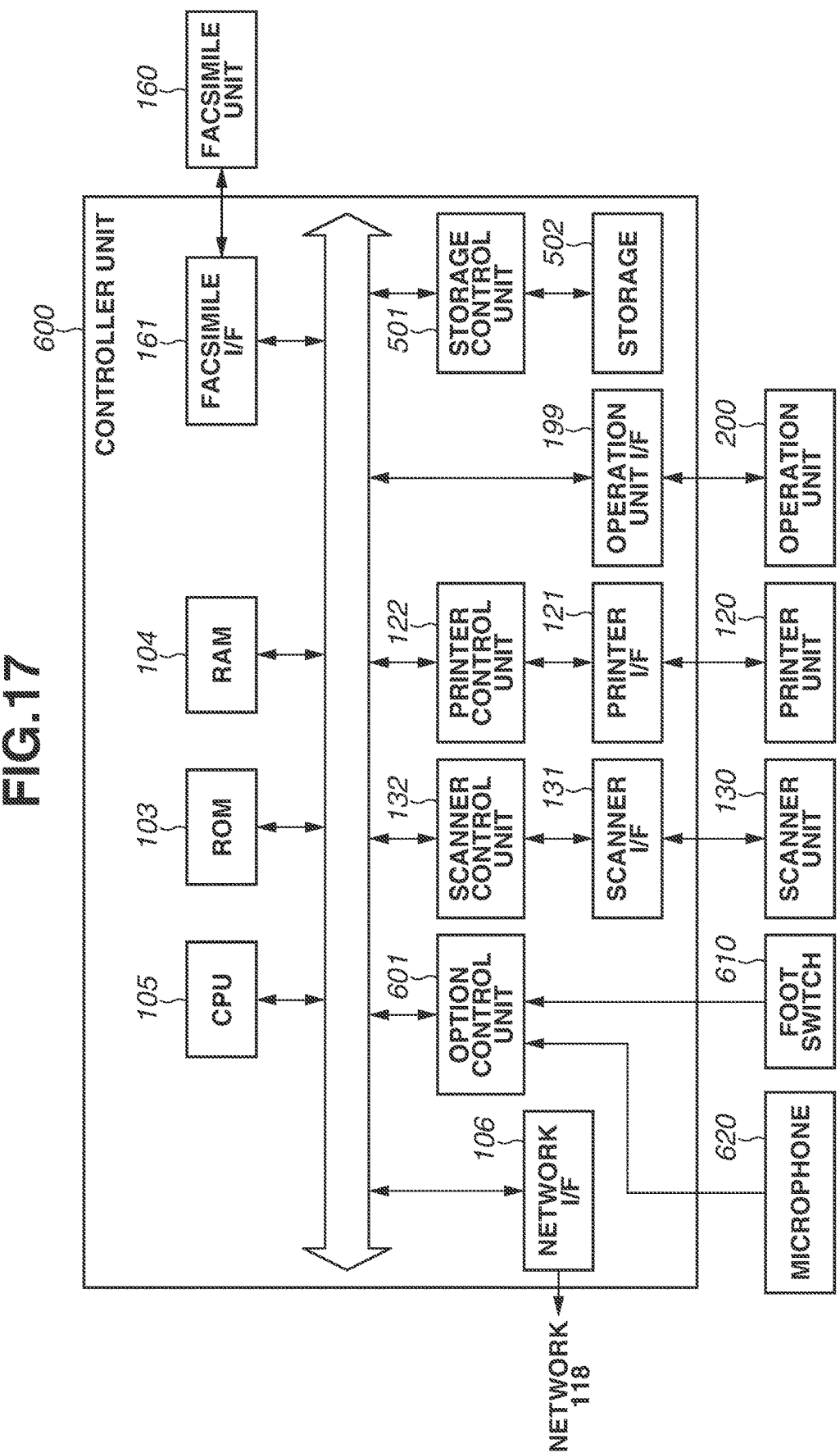
FIG. 17 is a block diagram illustrating a controller unit.

FIG. 17 is a block diagram illustrating the controller unit 600. Components of the controller unit 600 that correspond to components of the controller unit 100 have the same reference numerals as those used for the controller unit 100. A detailed description of these similar components is omitted herein.

An option control unit 601 controls the microphone 620 and the foot switch 610 under control of the CPU 105. The microphone 620 receives a user voice and transmits the received user voice to the option control unit 601. The voice content is identified under control of the CPU 105. The foot switch 610 is stepped on by the user to transmit a switch-on state to the option control unit 601.

Figure 18:
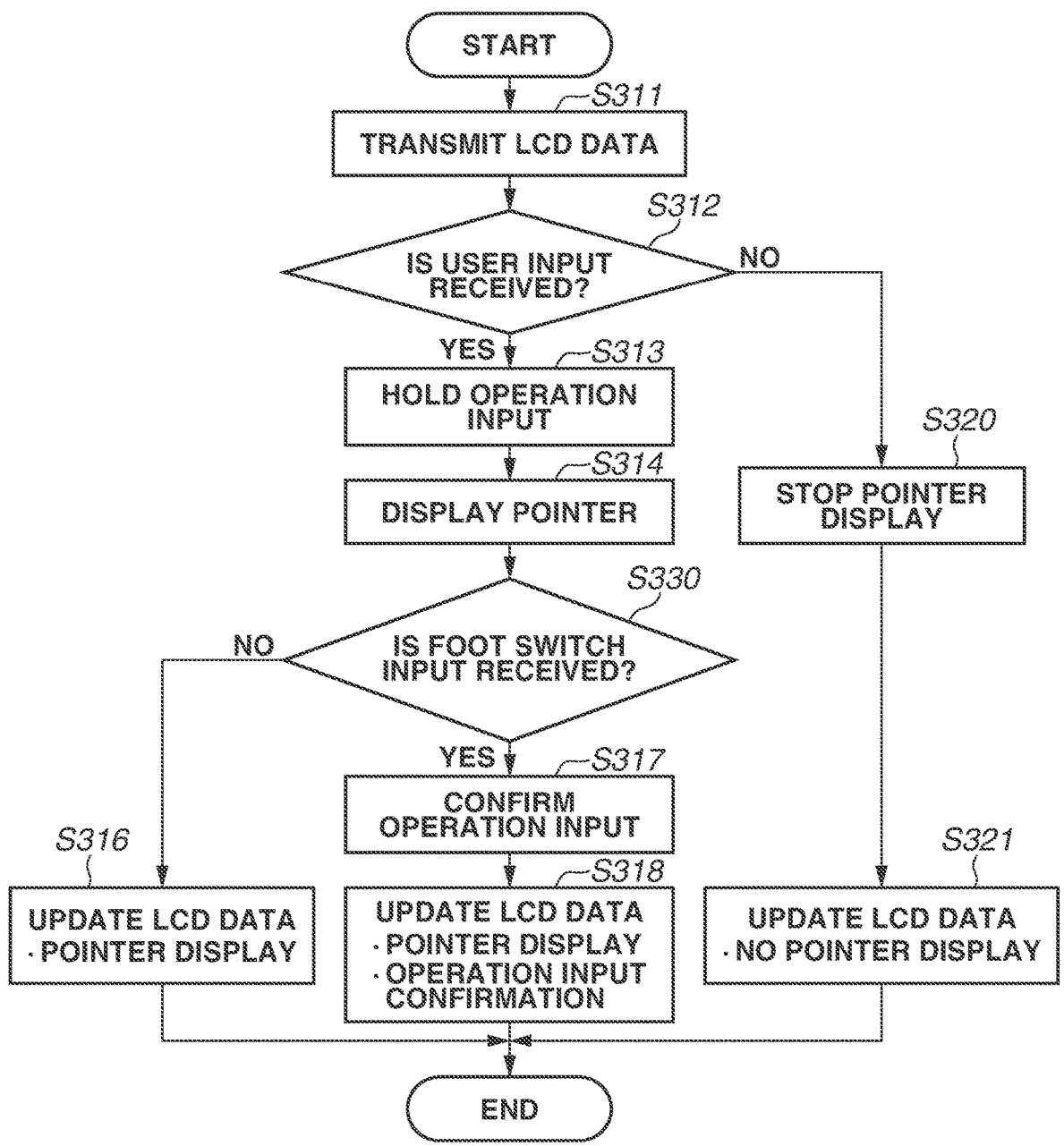
FIG. 18 is a flowchart illustrating an operation of confirming user input by a foot switch of the controller unit.

FIG. 18 is an operation procedure in a case where contactless input is confirmed using the foot switch 610. The steps in FIG. 18 are identical to those in FIG. 12, with the exception of step S315 of FIG. 12. Step S315 of the flowchart in FIG. 12, which illustrate a process of confirming user input by the controller unit 100, is replaced with step S330 in FIG. 18.

In step S330, a determination is made whether input via the foot switch 610 is received. The presence of input via the foot switch 610 indicates an input confirmation of the operation input. In a case where input via the foot switch 610 is received (YES in step S330), the CPU 105 determines that the operation input is confirmed, and the processing proceeds to step S317. In a case where no input via the foot switch 610 is received (NO in step S330), the processing proceeds to step S316.

Next, an operation procedure in a case where contactless input is confirmed using voice input will be described with reference to FIG. 19. The steps in FIG. 19 are identical to those in FIG. 12, with the exception of step S315 of FIG. 12. Step S315 of the flowchart in FIG. 12, which illustrates a process of confirming user input by the controller unit 100, is replaced with step S340 in FIG. 19.

In step S340, a determination is made whether the voice input "confirm" is received from the microphone 620. The voice input "confirm" from the microphone 620 indicates an input confirmation of the operation input. In a case where the voice input "confirm" is received from the microphone 620 (YES in step S340), the CPU 105 determines that the operation input is confirmed, and the processing proceeds to step S317. In a case where no voice input "confirm" is received from the microphone 620 (NO in step S340), the processing proceeds to step S316.

As described above, in the present exemplary embodiment, input is confirmed by acquisition of confirmation information based on "ON" input via the foot switch 610 or the voice input "confirm" from the microphone 620 in a state where the coordinates of the operation key are held. With this configuration, unintended multi-input and input errors, e.g., the processing proceeds to a next operation with the input being unset, are prevented.

While various examples and exemplary embodiments have been described above, these examples and embodiments are not seen to be limiting.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2021-101993, filed Jun. 18, 2021, which is hereby incorporated by reference herein in its entirety.

What is claimed is:

1. An information processing apparatus comprising:
a display unit configured to display at least one input object corresponding to data input;
a detection unit configured to detect a three-dimensional position of an object located within a predetermined distance in a vertical direction with respect to the display unit and that interacts with the display unit in a contactless manner, the display unit and the detection unit each being included in an operation panel;
a determination unit configured to determine the detected position of the object in relation to the at least one input object that is displayed on the display unit;
a selection unit configured to select, based on the position detected by the detection unit, one object from among a plurality of objects displayed on the display unit;
an input confirmation unit configured to receive an input, for determining an object, from a device different from the operation panel; and
a control unit configured to control update of the display by the display unit;
wherein, on a basis of the receipt, by the input confirmation unit, of the input in a state in which the one object is being selected by the selection unit, the control unit executes an instruction related to the selected one object.

2. The information processing apparatus according to claim 1, wherein the detection unit is a detection sensor.

3. The information processing apparatus according to claim 1,
wherein the input confirmation unit receives an the input for determining the object from a foot switch configured to issue a confirmation instruction to the input confirmation unit in a case where the foot switch is stepped on.

4. The information processing apparatus according to claim 1,
wherein the input confirmation unit receives an the input for determining the object from a voice recognition device configured to issue a confirmation instruction to the input confirmation unit in a case where the voice recognition device receives a predetermined instruction by voice.

5. The information processing apparatus according to claim 1, wherein a pointer is displayed on the display unit at a position corresponding to the position of the object in a case where the detection unit detects the object.

6. The information processing apparatus according to claim 1, further comprising a facsimile, wherein the at least one input object is an input object for data input relating to input of a destination of the facsimile.

7. The information processing apparatus according to claim 1, wherein the detection unit is a plurality of infrared sensor elements of an infrared contactless touch panel, where the infrared sensor elements are located in a vertical direction with respect to the display unit.

8. The information processing apparatus according to claim 1, wherein the detection unit is included in a capacitive contactless touch panel configured to detect the position of the object from the display unit based on an electrostatic capacitance generated between the display unit and the object.

9. A method for controlling an information processing apparatus that includes an operation panel including a display unit configured to display at least one input object corresponding to data input, the method comprising:

detecting a three-dimensional position of an object located within a predetermined distance in a vertical direction with respect to the display unit and that interacts with the display unit in a contactless manner;

determining the detected position of the object in relation to the at least one input object that is displayed on the display unit;

selecting, based on the detected position, one object from among a plurality of objects displayed on the display unit;

receiving an input, for determining an object, from a device different from the operation panel;

controlling to update the display by the display unit; and controlling to execute, on a basis of the receipt of the input in a state in which the one object is being selected in the selecting, an instruction related to the selected one object.

* * * * *